United States Patent
Byun

(10) Patent No.: US 11,663,139 B2
(45) Date of Patent: May 30, 2023

(54) APPARATUS FOR TRANSMITTING MAP INFORMATION IN MEMORY SYSTEM

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/832,755

(22) Filed: Jun. 6, 2022

(65) Prior Publication Data

US 2022/0300433 A1    Sep. 22, 2022

Related U.S. Application Data

(63) Continuation of application No. 16/733,867, filed on Jan. 3, 2020, now Pat. No. 11,354,250.

(30) Foreign Application Priority Data

Apr. 22, 2019   (KR) .................. 10-2019-0046914

(51) Int. Cl.
   *G06F 12/1009*   (2016.01)
(52) U.S. Cl.
   CPC .... *G06F 12/1009* (2013.01); *G06F 2212/657* (2013.01)
(58) Field of Classification Search
   CPC ........... G06F 12/1009; G06F 2212/657; G06F 3/064; G06F 3/061; G06F 3/0679; G06F 2212/1016; G06F 2212/7207; G06F 2212/7201; G06F 12/0246; G06F 3/0607; G06F 3/0658; G06F 3/0688
   See application file for complete search history.

(56) References Cited

U.S. PATENT DOCUMENTS

| | | | |
|---|---|---|---|
| 10,409,511 B1* | 9/2019 | Subbarao | G06F 3/0656 |
| 10,831,652 B2* | 11/2020 | Lee | G06F 11/1068 |
| 2014/0052898 A1* | 2/2014 | Nan | G06F 12/0246 |
| | | | 711/E12.008 |
| 2017/0039141 A1* | 2/2017 | Yeh | G06F 12/1009 |
| 2019/0121540 A1* | 4/2019 | Shin | G06F 13/126 |
| 2019/0258585 A1* | 8/2019 | Marcu | G06F 12/0246 |
| 2020/0004701 A1* | 1/2020 | Subbarao | G11C 29/52 |
| 2020/0034307 A1* | 1/2020 | Duzly | G06F 12/0246 |

* cited by examiner

*Primary Examiner* — Sean D Rossiter
(74) *Attorney, Agent, or Firm* — IP & T Group LLP

(57) ABSTRACT

A memory system may include: a nonvolatile memory device; and a controller suitable for generating first map information which maps physical addresses of the nonvolatile memory device to logical addresses received from a host, selecting some segments of the first map information as second map information, and outputting the second map information to the host, the controller may determine whether the second map information is updated, and may determine updated map segments as third map information, and the controller may output information to the host indicating the third map information corresponding to a command received from the host.

4 Claims, 17 Drawing Sheets

APPARATUS FOR TRANSMITTING MAP INFORMATION IN MEMORY SYSTEM

CROSS-REFERENCE TO RELATED APPLICATION

This application is a continuation of U.S. patent application Ser. No. 16/733,867 filed on Jan. 3, 2020, which claims priority under 35 U.S.C. § 119 to Korean Patent Application No. 10-2019-0046914 filed on Apr. 22, 2019, which is incorporated herein by reference in its entirety.

BACKGROUND

1. Field

Various embodiments relate to a memory system, and more particularly, to an apparatus in which a memory system included in a data processing system transmits map information to a host or a computing device.

2. Discussion of the Related Art

Recently, a paradigm for a computing environment has shifted to ubiquitous computing, which enables computer systems to be accessed virtually anytime and everywhere. As a result, the use of portable electronic devices, such as mobile phones, digital cameras, notebook computers, and the like, are rapidly increasing. Such portable electronic devices typically use or include a memory system that uses or embeds at least one memory device, i.e., a data storage device. The data storage device can be used as a main storage device or an auxiliary storage device of a portable electronic device.

Unlike a hard disk, a data storage device using a nonvolatile semiconductor memory device is advantageous in that it has excellent stability and durability because it has no mechanical driving parts (e.g., a mechanical arm), has high data access speed, and low power consumption. In the context of a memory system having such advantages, a data storage device includes a USB (Universal Serial Bus) memory device, a memory card having various interfaces, a solid state drive (SSD), and the like.

SUMMARY

Various embodiments are directed to a data processing system which transfers data between components in the data processing system including components or resources such as a memory system and a host.

Also, various embodiments are directed to an apparatus in which a memory system in a data processing system may transmit map information to a host or a computing device to allow the host or the computing device to transmit a command including map information to the memory system, thereby improving the operation performance of the memory system.

Further, various embodiments are directed to an apparatus in which, after a memory system in a data processing system transmits map information to a host or a computing device, information corresponding to whether the update of the map information is performed in the memory system may be transmitted to the host or the computing device to allow the host or the computing device to self-unmap the map information therein, thereby preventing a command from including unnecessary map information being transmitted from the host or the computing device to the memory system and thus improving the operation performance of the memory system.

It is to be understood that technical objectives to be achieved by the disclosure are not limited to the aforementioned technical objectives and other technical objectives which are not described herein will be apparent from the following description to one of ordinary skill in the art to which the disclosure pertains.

In an embodiment, a memory system may include: a nonvolatile memory device; and a controller suitable for generating first map information which maps physical addresses of the nonvolatile memory device to logical addresses received from a host, selecting some segments of the first map information as second map information, and outputting the second map information to the host, the controller may determine whether the second map information is updated, and may determine updated map segments as third map information, and the controller may output information to the host indicating the third map information corresponding to a command received from the host.

After performing an operation corresponding to the command, when the third map information exists, the controller may generate a response for the command and outputs the response to the host, the response including a logical address of the third map information.

The response may include a set flag, and the controller may set the set flag to indicate that the logical address of the third map information is included in the response.

The controller may output the response, which includes a logical address in at least one selected map segment of K number of map segments in the third map information, where K may be a natural number equal to or greater than 1.

The controller may erase the selected map segment after outputting the response.

The controller may generate output information for identifying whether a corresponding map segment is outputted to the host, of M number of map segments included in the second map information, where M may be a natural number equal to or greater than K.

The controller may update the output information to identify the selected map segment after outputting the response.

The controller may select at least one of the M number of map segments in the second map information, as an output map segment, by referring to the output information, and may output the output map segment to the host corresponding to a first command from the host.

The controller may output the response with the output map segment, after performing an operation corresponding to the first command.

When the first command is received from the host depending on a determination of the host after noticing a request for outputting the second map information to the host, the controller may output the output map segment to the host corresponding to the first command.

The controller may select L number of map segments not outputted to the host of the M number of map segments in the second map information, as output map segments, by referring to the output information, the controller may successively output L times by segment unit, the L number of map segments selected as the output map segments to the host, corresponding to the first command, wherein L may be a natural number equal to or less than M.

The controller may divide each of the M number of map segments in the second map information, into N number of map sub-segments, and may generate (M*N) number of update information indicating whether each of (M*N) number of map sub-segments is updated, where M may be a natural number equal to or greater than K, and N may be a natural number of equal to or greater than 2.

When an occupation percentage of update information indicating updated of N number of update information corresponding to any one specific map segment in the second map information is equal to or greater than a set percentage, the controller may determine the specific map segment as the third map information.

The controller may check whether a command from the host includes a first logical address and a first physical address, may determine validity of the first physical address by referring to the (M*N) number of update information, and, when it is determined that the first physical address is valid, may perform the command from the host, by using the first physical address.

When the first physical address is not valid as a result of checking the validity, the controller may neglect the first physical address, may search for a valid physical address corresponding to the first logical address by referring to the first map information, and may perform the command from the host, by using the searched valid physical address.

The controller may select any one update information corresponding to the first logical address of the (M*N) number of update information, may determine the first physical address as valid when it is indicated that the selected update information is not updated, and may determine the first physical address as invalid when it is indicated that the selected update information is updated.

In an embodiment, a data processing system may include: a host suitable for generating, changing or updating a logical address corresponding to data; and a memory system including a nonvolatile memory device for storing the data, and suitable for generating first map information which maps physical addresses of the nonvolatile memory device to logical addresses, selecting some segments of the first map information, as second map information, and outputting the second map information to the host, the memory system may determine whether the second map information is updated, and may determine updated map segments as third map information, and may output information indicating the third map information to the host corresponding to a command received from the host, and the host may unmap a logical address corresponding to the indication information of the second map information.

The host may include a host memory for storing the second map information, and after generating a first command and outputting the first command to the memory system, when a response corresponding to the first command is received from the memory system, the host may store at least one map segment in the response, in the host memory, as the second map information.

When a request for output of the second map information is noticed from the memory system, the host may check a state of the host memory, may selectively generate the first command depending on a checking result, and may output the first command to the memory system.

The host may select a first physical address corresponding to a first logical address, by referring to the second map information stored in the host memory, and after outputting the first logical address and the first physical address together with a second command to the memory system, the host may receive data corresponding to the first logical address, from the memory system.

After generating a second command and outputting the second command to the memory system, when a response corresponding to the second command is received from the memory system and a specific logical address is included in the response, the host may unmap specific map information corresponding to the specific logical address of the second map information stored in the host memory.

A set flag may be included in the response corresponding to the second command, and the host may check the set flag, and, when it is checked that the set flag is in a set state, may recognize that the specific logical address is included in the response corresponding to the second command and may check a value of the specific logical address.

When it is checked that the set flag is in a reset state, the host may recognize that the specific logical address is not included in the response corresponding to the second command.

In an embodiment, a method for operating a memory system including a nonvolatile memory device and a controller, the method may include: generating first map information which maps physical addresses of the nonvolatile memory device to logical addresses received from a host; selecting some segments of the first map information, as second map information; outputting the second map information to the host; determining whether the second map information is updated to determine updated map segments, as third map information; and outputting information to the host indicating the third map information corresponding to a command received from the host.

The outputting of the information may include: performing an operation corresponding to the command; and outputting a response for the command to the host, the response including a logical address of the third map information.

The response may include a predetermined flag, and the outputting of the information may further include: setting the set flag to indicate that the logical address of the third map information is included in the response.

The outputting of the response may include outputting the response, which includes a logical address in at least one selected map segment of K number of map segments in the third map information, where K may be a natural number of equal to or greater than 1.

The outputting of the information may further include: erasing the selected map segment after outputting the response.

The outputting of the information may further include: generating output information for identifying whether a corresponding map segment is outputted to the host, of M number of map segments included in the second map information, wherein M may be a natural number equal to or greater than K.

The outputting of the information may further include: updating the output information to identify the selected map segment after outputting the response.

The method may further include: selecting at least one of the M number of map segments in the second map information, as an output map segment, by referring to the output information, and outputting the output map segment to the host corresponding to a first command from the host.

The outputting of the output map segment may include: performing an operation corresponding to the first command from the host; and outputting the response with the output map segment.

The outputting of the output map segment may further include: noticing a request for outputting the second map information to the host; and receiving the first command from the host depending on a determination of the host.

The outputting of the output map segment may include: selecting L number of map segments not outputted to the host of the M number of map segments in the second map information, as output map segments, by referring to the output information, and successively outputting L times by segment unit, the L number of map segments selected as the output map segments to the host, in corresponding to the first command, where L may be a natural number equal to or less than M.

The method may further include: dividing each of the M number of map segments in the second map information, into N number of map sub-segments, and generating (M*N) number of update information indicating whether each of (M*N) number of map sub-segments is updated, where M is a natural number equal to or greater than K and N is a natural number of equal to or greater than 2.

When an occupation percentage of update information indicating updated of N number of update information corresponding to any one specific map segment in the second map information is equal to or greater than a set percentage, the specific map segment may be determined to be the third map information.

The method may further include: checking whether a command from the host includes a first logical address and a first physical address, and, when it is checked that the command includes the first logical address and the first physical address, determining validity of the first physical address by referring to the M*N number of update information; and when it is determined that the first physical address is valid, performing the command from the host, using the first physical address.

When it is determined that the first physical address is not valid, the performing of the command may include: neglecting the first physical address, searching for a valid physical address corresponding to the first logical address, by referring to the first map information, and performing the command from the host, by using the searched valid physical address.

The determining of the validity of the first physical address may include: selecting any one update information corresponding to the first logical address of the (M*N) number of update information, and determining the first physical address as valid when it is indicated that the selected update information is not updated; and determining the first physical address as invalid when it is indicated that the selected update information is updated.

In an embodiment, a data processing system may include: a host; and a memory system, which includes a memory device including a plurality of memory regions having a plurality of physical addresses and a controller, the controller may be suitable for: generating map information including a plurality of map segments, which indicate mapping between the physical addresses and logical addresses from the host; transmitting, to the host, selected map segments of plurality of map segments; determining whether the selected map segments are updated; and transmitting, to the host, response information in response to a command from the host, the response information which includes indication information indicating updated map segments of the selected map segments. The host may unmap the updated map segments of the selected map segments, based on the indication information.

Some advantageous effects of the apparatus according to the embodiments of the disclosure are as follows.

The data processing system in accordance with the embodiments of the disclosure provides an advantage in that, in the case where map information which is shared by a host or a computing device and a memory system in the data processing system becomes different from each other due to a predetermined operation in the memory system, the host or the computing device recognizes that the map information is different for specific map information and does not use the corresponding map information, thereby improving the data input/output performance of the memory system.

Moreover, in the embodiments of the disclosure, the host or the computing device may selectively transmit a physical address corresponding to a logical address in a read command to be transmitted to the memory system, thereby preventing an operation of determining validity of the physical address from being unnecessarily performed in the memory system, and through this, the operation performance of the memory system is improved.

DETAILED DESCRIPTION

Figure 1:
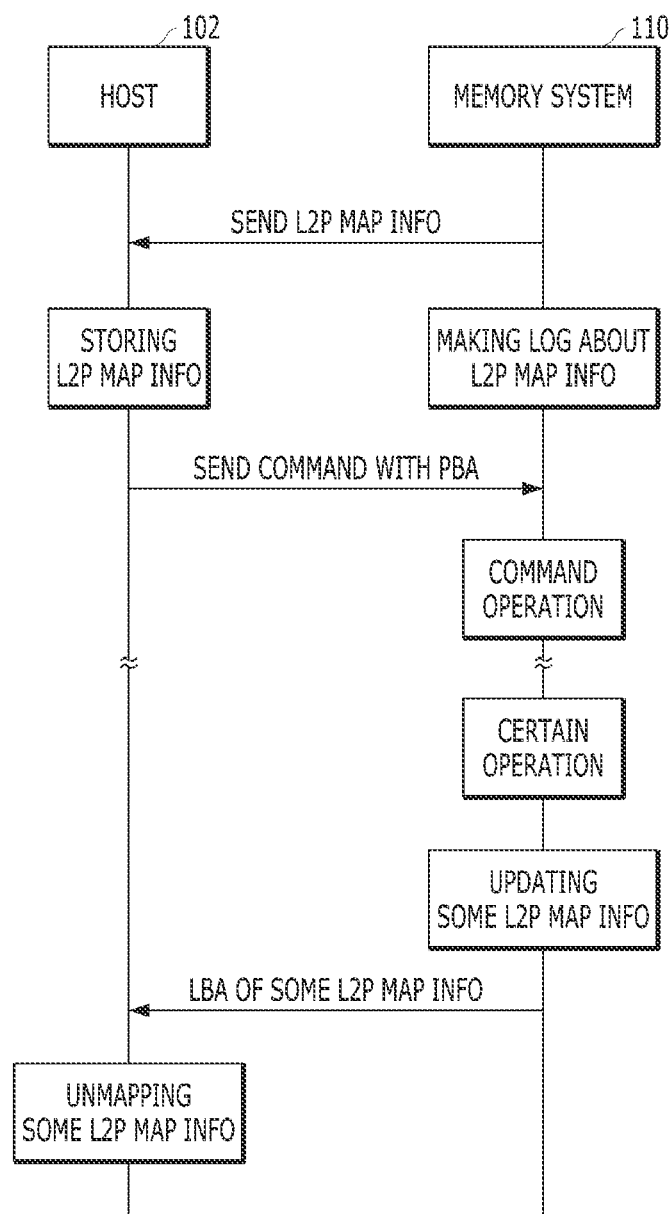
FIG. 1 is a diagram illustrating a method for sharing map information in accordance with an embodiment of the disclosure.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a diagram illustrating a method for sharing map information in accordance with an embodiment of the disclosure.

FIG. 1 describes how to share map information between a host 102 and a memory system 110 in a data processing system in accordance with an embodiment of the present disclosure.

Referring to FIG. 1, the host 102 and the memory system 110 may be operatively engaged. The host 102 may include a computing device and may be implemented in a form of a mobile device, a computer or a server. The memory system 110 operatively engaged with the host 102 may receive a command from the host 102 and store or output data in response to the received command.

The memory system 110 may have a storage space including nonvolatile memory cells. For example, the memory system 110 may be implemented in a form of a flash memory or a solid-state drive (SSD).

In order to store data in response to a request by the host 102 in a storage space including the nonvolatile memory cells, the memory system 110 can perform a mapping operation for associating a file system used by the host 102 with a storage space including the nonvolatile memory cells. This can be referred as to an address translation between a logical address and a physical address. For example, an address identifying data according to the file system used by the host 102 may be called a logical address or a logical block address. The address indicating a physical location of data in the storage space including nonvolatile memory cells may be referred to as a physical address or a physical block address. When the host 102 sends a read command with a logical address to the memory system 110, the memory system 110 can search for a physical address corresponding to the logical address, and then read and output data stored in a physical location indicated by the physical address. During these processes, the mapping operation or the address translation may be performed while the memory system 110 searches for the physical address corresponding to the logical address inputted from the host 102. The mapping operation can be performed based on mapping information such as a mapping table which can associate a logical address with a physical address.

If the host 102 can perform the mapping operation performed by the memory system 110, an amount of time taken for the memory system 110 to read and output data corresponding to a read command transmitted by the host 102 may be reduced. The host 102 may store and access some map information for performing the mapping operation, in order to deliver the read command with the physical address to the memory system 110 through the mapping operation.

The memory system 110 may transmit map information (i.e., logical-to-physical (L2P) map information) MAP_INFO to the host 102. The host 102 may store the map information MAP_INFO in a memory included in the host 102. When the memory system 110 sends the entire map information to the host 102 and the host 102 can store the entire map information in the memory, the memory system 110 may not need to write a log regarding transmitted map information. However, it may be difficult for the host 102 to allocate a storage space in a memory for storing the entire map information, which is generated and delivered by the memory system 110. Accordingly, when the host 102 has limited storage space for storing map information, the memory system 110 may select a part of the map information in which data or a logical address is frequently used or accessed by the host 102, and transmit the selected map information to the host 102.

The memory system 110 may transmit some of the map information to the host 102 and generate a log (or a history) regarding the transmitted map information. The log may have one of various formats, structures, marks, variables, or types, and may be stored in a memory device or a storage area including nonvolatile memory cells. According to an embodiment, whenever the memory system 110 transmits map information to the host 102, the log may include data which is relevant to transmitted map information.

Further, the memory system 110 may determine an amount of transmitted map information in the log corresponding to a size of map information that can be transmitted to the host 102. As an example, a size of map information that the memory system 110 can transmit to the host 102 is 512 KB. Although the memory system 110 may transmit more than 512 KB of map information to the host 102, the amount of transmitted map information in the log may be limited to 512 KB. The amount of map information that the memory system 110 can send to the host 102 at one time may be less than the amount of map information that the host 102 may store in the memory. For example, the map information may be transmitted to the host 102 in a segment unit. The memory system 110 may transfer segments of the map information to the host 102 several times. The segments of the map information may be transmitted to the host 102 continuously or intermittently.

According to an embodiment, when the memory system 110 transmits more than 1 MB of map information to the host 102, the host 102 can delete old map information, i.e., old map information previously transmitted from the memory system 110 and stored in a memory thereof. In addition, the map information may include update information. Because a memory allocated by the host 102 to store the map information includes volatile memory cells (an overwrite is supported), the host 102 can update map information based on the update information without an additional operation of erasing other map information.

The host 102 may add a physical address PBA to a command, which is to be transmitted to the memory system 110, based on the map information. In the mapping operation, the host 102 may search for and find the physical address PBA in the map information stored in the memory, based on a logical address corresponding to a command transmitted to the memory system 110. When the physical address exists and is found, the host 102 may transmit the command with the logical address and the physical address to the memory system 110.

The memory system 110 may receive a command with a logical address and a physical address from the host 102, and may perform a command operation corresponding to the command. As described above, when the host 102 transfers a physical address corresponding to a read command, the memory system 110 may use the physical address to access and output data stored in a location indicated by the physical address using the corresponding physical address. The memory system 110 may perform a certain operation in response to the read command without address translation, so that the memory system 110 may reduce a time spent on the operation.

If a predetermined operation is performed in the memory system 110, some map information (SOME L2P MAP INFO) managed in the memory system 110 may be updated (UPDATING). Thereafter, the memory system 110 may transmit a logical address LBA of the some map information (SOME L2P MAP INFO) updated therein, to the host 102. In response to at least one logical address LBA received from the memory system 110, the host 102 may unmap at least one map information among map information stored therein (UNMAPPING). Accordingly, the host 102 may transfer a physical address PBA with a command to the memory system 110, using only the remaining map information except the at least one map information unmapped among the stored map information therein.

When power is not supplied to the host 102 and the memory system 110, all map information which is stored in the memory including volatile memory cells in the host 102 is lost. Power-off or power-on at the host 102 and the memory system 110 may occur according to user's request, or in an undesired situation regardless of a user's request. While power is supplied to the host 102 and the memory system 110, the memory system 110 may store a log regarding map information transmitted to the host 102. Thereafter, when power is resumed after power-off, the memory system 110 may transmit map information to the host 102 based on the log so that the host 102 may perform a mapping operation and transmit a command with a logical address and a physical address into the memory system 110. After power is resumed, the host 102 may quickly recover an operation state regarding the mapping operation, which is substantially the same as that before the power supply is stopped or not supplied.

Before there is a power cut and after power is resumed, the needs and usage patterns of users who use a data processing system including the host 102 and the memory system 110 may be similar or different. When a user's needs and usage patterns are not changed, the host 102 may have tried to access the same data at a high frequency. When the host 102 performs a mapping operation regarding such data, and the memory system 110 can output data more quickly in response to a read command with a logical address and a physical address, it is likely that performance of the data processing system may be improved.

Figure 2:
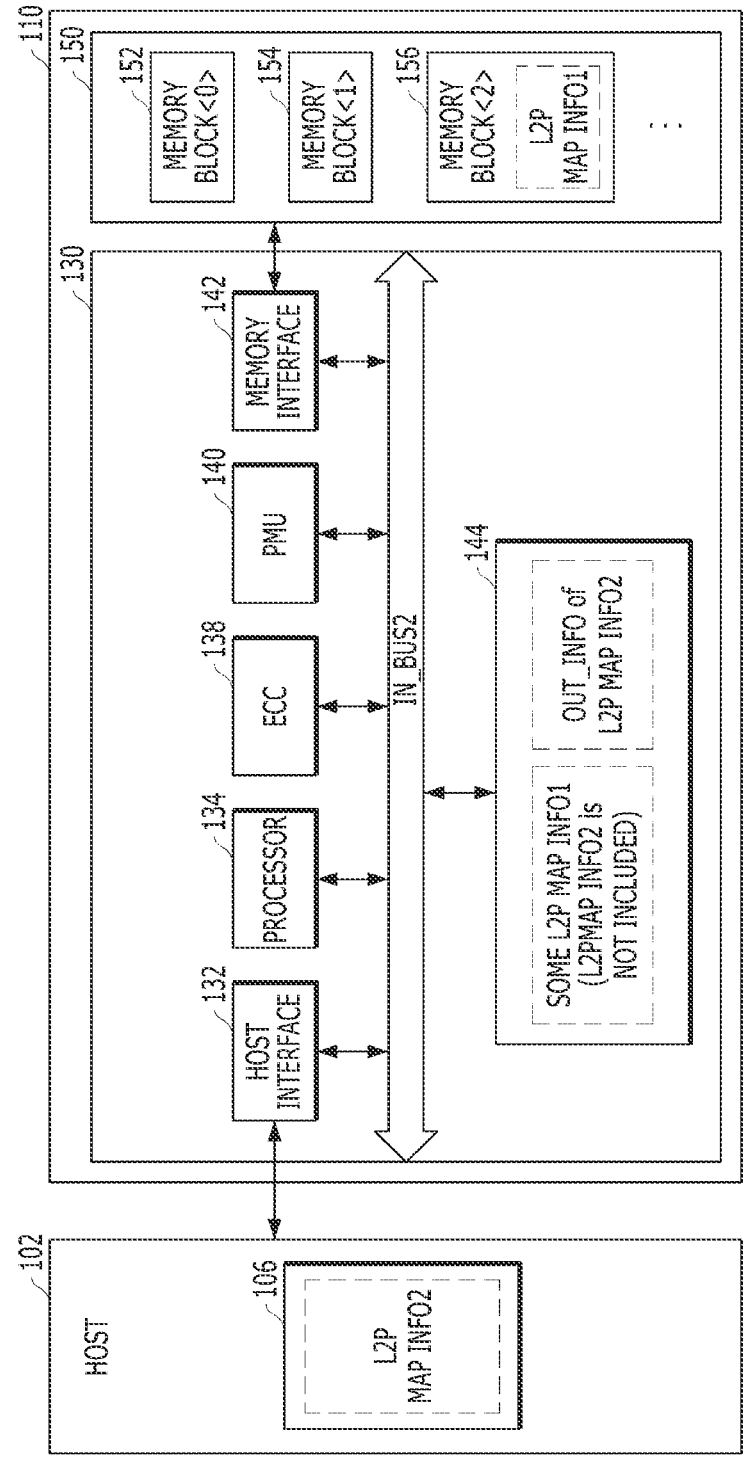
FIG. 2 is a diagram schematically illustrating a data processing system including a memory system in accordance with an embodiment of the disclosure.

FIG. 2 illustrates a data processing system 100 in accordance with an embodiment of the present disclosure. Referring to FIG. 2, the data processing system 100 may include a host 102 engaged or operating with a memory system 110.

The host 102 may include, for example, a portable electronic device such as a mobile phone, an MP3 player and a laptop computer, or an electronic device such as a desktop computer, a game player, a television (TV) and a projector.

The host 102 also includes at least one operating system (OS), which can generally manage and control functions and operations performed in the host 102. The OS can provide interoperability between the host 102 engaged with the memory system 110 and the user of the memory system 110. The OS may support functions and operations corresponding to a user's requests. By way of example but not limitation, the OS can be classified into a general operating system and a mobile operating system according to mobility of the host 102. The general operating system may be split into a personal operating system and an enterprise operating system according to system requirements or a user's environment. The personal operating system, including Windows and Chrome, may be subject to support services for general purposes. The enterprise operating systems can be specialized for securing and supporting high performance, including Windows servers, Linux and Unix. Further, the mobile operating system may include Android, iOS and Windows mobile. The mobile operating system may be subject to support services or functions for mobility (e.g., a power saving function). The host 102 may include a plurality of operating systems. The host 102 may execute multiple operating systems interlocked with the memory system 110, corresponding to a user's request. The host 102 may transmit a plurality of commands corresponding to the user's requests to the memory system 110, thereby performing operations corresponding to commands within the memory system 110.

The memory system 110 may perform a specific function or operation in response to a request from the host 102. Particularly, the memory system 110 may store data to be accessed by the host 102. The memory system 110 may be used as a main memory system or an auxiliary memory system of the host 102. The memory system 110 may be implemented with any of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card and a memory stick.

The storage devices for the memory system 110 may be implemented with a volatile memory device, for example, a dynamic random access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM), and a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in any of the various types of memory systems discussed above.

By way of example but not limitation, the controller 130 and the memory device 150 may be integrated into a single semiconductor device. The controller 130 and memory device 150 may be integrated into an SSD for improving an operation speed. When the memory system 110 is used as an SSD, the operating speed of the host 102 connected to the memory system 110 can be improved more than that of the host 102 implemented with a hard disk. In addition, the controller 130 and the memory device 150 may be integrated into one semiconductor device to form a memory card, such as a personal computer (PC) card (e.g., a PCMCIA card), a compact flash card (CF), a memory card such as a smart media card (e.g., SM, SMC), a memory stick, a multimedia card (e.g., MMC, RS-MMC, MMCmicro), a secure digital (SD) card (e.g., SD, miniSD, microSD, SDHC), or a universal flash memory.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even when electrical power is not supplied. The memory device 150 may store data provided from the host 102 through a write operation, and provide data stored therein to the host 102 through a read operation. The memory device 150 may include a plurality of memory blocks 152, 154, 156, each of which may include a plurality of pages. Each of the plurality of pages may include a plurality of memory cells to which a plurality of word lines (WL) are electrically coupled. The memory device 150 also includes a plurality of memory dies, each of which includes a plurality of planes, each of which includes a plurality of memory blocks 152, 154, 156. In addition, the memory device 150 may be a non-volatile memory device, for example, a flash memory, which may be embodied in a three-dimensional stack structure.

The controller 130 may control overall operations of the memory device 150, such as read, write, program, and erase operations. For example, the controller 130 may control the memory device 150 in response to a request from the host 102. The controller 130 may read data from the memory device 150, and provide the read data to the host 102. The controller 130 may also receive data from the host 102, and store the received data into the memory device 150.

The controller 130 may include a host interface (I/F) 132, a processor 134, an error correction code (ECC) component 138, a power management unit (PMU) 140, a memory interface (I/F) 142, and a memory 144, all operatively coupled via an internal bus.

The host interface 132 may process commands and data provided by the host 102. The host interface 132 may communicate with the host 102 through at least one of various interface protocols such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI), and integrated drive electronics (IDE). In accordance with an embodiment, the host interface 132 is a component for exchanging data with the host 102, which may be implemented through firmware called a host interface layer (HIL).

The ECC component 138 may correct error bits of the data to be processed in the memory device 150. The ECC component 138 may include an ECC encoder and an ECC decoder. Here, the ECC encoder may perform error correction encoding on data to be programmed in the memory device 150 to generate encoded data into which a parity bit is added and store the encoded data in memory device 150. The ECC decoder may detect and correct errors in data read from the memory device 150 when the controller 130 reads the data stored in the memory device 150. In other words, after performing error correction decoding on the data read from the memory device 150, the ECC component 138 may determine whether the error correction decoding has succeeded and output an instruction signal (e.g., a correction success signal or a correction fail signal). The ECC component 138 may use the parity bit which is generated during the ECC encoding process, for correcting the error bit of the read data. When the number of the error bits is greater than or equal to a threshold number of correctable error bits, the ECC component 138 may not correct error bits but instead may output an error correction fail signal indicating failure in correcting the error bits.

The ECC component 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), or a Block coded modulation (BCM). The ECC component 138 may include all circuits, modules, systems or devices for performing the error correction operation based on at least one of the above described codes.

The PMU 140 may manage electrical power provided in the controller 130.

The memory interface 142 may serve as an interface for handling commands and data transferred between the controller 130 and the memory device 150, to allow the controller 130 to control the memory device 150 in response to a request from the host 102. The memory interface 142 may generate a control signal for the memory device 150 and may process data entered into or outputted from the memory device 150 under the control of the processor 134 when the memory device 150 is a flash memory, in particular, a NAND flash memory. The memory interface 142 may provide an interface for handling commands and data between the controller 130 and the memory device 150, for example, operations of NAND flash interface. In accordance with an embodiment, the memory interface 142 may be implemented through firmware called a flash interface layer (FIL) as a component for exchanging data with the memory device 150.

The memory 144 may support operations performed by the memory system 110 and the controller 130. The memory 144 may store temporary or transactional data which occur or are delivered for operations in the memory system 110 and the controller 130. The controller 130 may control the memory device 150 in response to a request from the host 102. The controller 130 may deliver data read from the memory device 150 to the host 102. The controller 130 may store data entered through the host 102 within the memory device 150. The memory 144 may be used to store data for the controller 130 and the memory device 150 to perform operations such as read operations or program (or write) operations.

The memory 144 may be implemented as a volatile memory. The memory 144 may be implemented with a static random access memory (SRAM), a dynamic random access memory (DRAM), or both. Although FIG. 2 illustrates that the second memory 144 is disposed within the controller 130, embodiments are not limited thereto. That is, the memory 144 may be located within or external to the controller 130. For instance, the memory 144 may be embodied by an external volatile memory having a memory interface transferring data and/or signals between the memory 144 and the controller 130.

The memory 144 may store data necessary for performing read or program operations. The memory 144 may store data necessary for data transfer between the memory device 150 and the controller 130 for background operations such as garbage collection and wear levelling. In accordance with an embodiment, for supporting operations in the memory system 110, the memory 144 may include a program memory, a data memory, a write buffer/cache, a read buffer/cache, a data buffer/cache, and a map buffer/cache.

The processor 134 may be implemented with a microprocessor or a central processing unit (CPU). The memory system 110 may include one or more processors 134. The processor 134 may control the overall operations of the memory system 110. By way of example but not limitation, the processor 134 may control a program operation or a read operation of the memory device 150, in response to a write request or a read request from the host 102. In accordance with an embodiment, the processor 134 may execute firmware to control the overall operations of the memory system 110. Herein, the firmware may be referred to as a flash translation layer (FTL). The FTL may perform an operation as an interface between the host 102 and the memory device 150. The host 102 may transmit requests for write and read operations to the memory device 150 through the FTL.

The FTL may manage operations of address mapping, garbage collection and wear-leveling. Particularly, the FTL may load, generate, update, or store map data. Therefore, the controller 130 may map a logical address, which is entered from the host 102, to a physical address of the memory device 150 through the map data. The memory device 150 may look like a general storage device to perform a read or write operation because of the address mapping operation. When the controller 130 tries to update data stored in a particular page, the controller 130 may program the updated data on another empty page and may invalidate old data of the particular page due to a characteristic of a flash memory device. In other words, the controller 130 may perform the address mapping operation based on the map data to update a physical address of the particular page corresponding to a logical address of the updated data to a physical address of the another newly programed page. Further, the controller 130 may store map data of the new data into the FTL.

For example, when performing an operation requested from the host 102 in the memory device 150, the controller 130 uses the processor 134. The processor 134 may handle instructions or commands corresponding to an inputted command from the host 102. The controller 130 may perform a foreground operation such as a command operation, corresponding to an command inputted from the host 102, for example, a program operation corresponding to a write command, a read operation corresponding to a read command, an erase/discard operation corresponding to an erase/discard command and a parameter set operation corresponding to a set parameter command or a set feature command with a set command.

For another example, the controller 130 may perform a background operation on the memory device 150 through the processor 134. By way of example but not limitation, the background operation includes an operation of copying and storing data stored in a memory block among the memory blocks 152, 154, 156 in the memory device 150 to another memory block, e.g., a garbage collection (GC) operation. The background operation may include an operation of moving or swapping data stored in at least one of the memory blocks 152, 154, 156 into at least another of the memory blocks 152, 154, 156, e.g., a wear leveling (WL) operation. During a background operation, the controller 130 may use the processor 134 for storing the map data stored in the controller 130 to at least one of the memory blocks 152, 154, 156 in the memory device 150, e.g., a map flush operation. A bad block management operation of checking or searching for bad blocks among the memory blocks 152, 154, 156 is another example of a background operation performed by the processor 134.

The controller 130 performs a plurality of command operations corresponding to a plurality of commands entered from the host 102. For example, when performing a plurality of program operations corresponding to a plurality of program commands, a plurality of read operations corresponding to a plurality of read commands, and a plurality of erase operations corresponding to a plurality of erase commands sequentially, randomly, or alternatively, the controller 130 may determine which channel(s) or way(s) of a plurality of channels (or ways) for connecting the controller 130 to a plurality of memory dies in the memory 150 is proper for performing each operation. The controller 130 may transmit data or instructions via determined channels or ways for performing each operation. The plurality of memory dies in the memory 150 may transmit an operation result via the same channels or ways, respectively, after each operation is completed. Then, the controller 130 may transmit a response or an acknowledge signal to the host 102. In an embodiment, the controller 130 may check a status of each channel or each way. In response to a command from the host 102, the controller 130 may select at least one channel or way based on the status of each channel or each way so that instructions and/or operation results with data may be delivered via selected channel(s) or way(s).

By way of example but not limitation, the controller 130 may recognize statuses regarding a plurality of channels (or ways) associated with a plurality of memory dies in the memory device 150. The controller 130 may determine the state of each channel or each way as one of a busy state, a ready state, an active state, an idle state, a normal state, and/or an abnormal state. The determination result may be associated with a physical block address, e.g., which die(s) the instruction (and/or the data) is delivered into. The controller 130 may refer to descriptors delivered from the memory device 150. The descriptors may include a block or page of parameters that describe something about the memory device 150, which is data with a predetermined format. For instance, the descriptors may include device descriptors, configuration descriptors, and unit descriptors. The controller 130 may refer to the descriptors to determine which channel(s) or way(s) an instruction or data is exchanged via.

A management unit (not shown) may be included in the processor 134. The management unit may perform bad block management of the memory device 150. The management unit may find bad memory blocks in the memory device 150, which are in unsatisfactory condition for further use, as well as perform bad block management on the bad memory blocks. When the memory device 150 is a flash memory (for example, a NAND flash memory), a program failure may occur during the write operation due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 110. Thus, reliable bad block management may improve performance of the memory system 110.

A program operation, a read operation and an erase operation of the controller 130 will be described below.

During the program operation, the controller 130 may perform an operation of storing program data corresponding to a program command from the host 102, in a buffer/cache in the memory 144 of the controller 130, and then, storing the data stored in the buffer/cache, in the memory blocks 152, 154 and 156 in the memory device 150. Also, the controller 130 may update map data corresponding to the program operation to the memory device 150, and may store the updated map data in the memory blocks 152, 154 and 156 in the memory device 150.

During the read operation, when a read command is received from the host 102, the controller 130 may read data corresponding to the read command, from the memory device 150, by checking map data of the data corresponding to the read command. Further, the controller 130 may store the read data in the buffer/cache in the memory 144, and may provide the data stored in the buffer/cache, to the host 102.

During the erase operation, when an erase command is received from the host 102, the controller 130 may perform an erase operation of checking a memory block corresponding to the erase command, erasing data stored in the checked memory block, updating map data corresponding to the erased data and storing updated map data in the memory blocks 152, 154 and 156 in the memory device 150.

Map data may include logical/physical (or logical to physical (L2P)) information and physical/logical (or physical to logical (P2L)) information on data stored in memory blocks which correspond to a program operation.

Data corresponding to a command may include user data and metadata. The metadata may include map data generated by the controller 130 corresponding to the user data which is stored in the memory device 150. Also, the metadata may include information on command data corresponding to a command received from the host 102, information on a command operation corresponding to the command, information on the memory blocks of the memory device 150 for which the command operation is to be performed, and information on map data corresponding to the command operation. In other words, the metadata may include information and data for the command operation, except for user data corresponding to the command from the host 102.

That is, when a write command is received from the host 102, the controller 130 performs a program operation corresponding to the write command. At this time, the controller 130 may store user data corresponding to the write command, in at least one of the memory blocks 152, 154 and 156 of the memory device 150. For example, the user data may be stored in empty memory blocks, open memory blocks or free memory blocks for which an erase operation is performed. Also, the controller 130 may store logical/physical address information (i.e., an L2P map) and physical/logical address information (i.e., a P2L map) for the user data stored in memory blocks, in empty memory blocks, open memory blocks or free memory blocks among the memory blocks, in the form of a map table or a map list.

User data to be stored in the memory device 150 may be divided by the unit of a segment having a preset size. The preset size may be the same as a minimum data size required for the memory system 110 to interoperate with the host 102. According to an embodiment, a size of a data segment as the unit of user data may be determined to correspond to a configuration and a control method in the memory device 150. While storing data segments of user data in the memory blocks of the memory device 150, the controller 130 may generate or update a map address corresponding to a stored data segment. When meta segments are generated by the controller 130 or map segments stored in memory blocks are loaded to the memory 144 and are then updated, the map segments may be stored in the memory blocks of the memory device 150. Each of the meta segments as the unit of metadata may include a map address. For example, each of the meta segments may include logical/physical (L2P) segments and physical/logical (P2L) segments as map segments of map data.

Referring to FIGS. 1 and 2, the memory system 110 may generate first map information L2P MAP INFO1 which maps a physical address of data in the memory device 150, corresponding to a logical address inputted from the host 102. The entire first map information L2P MAP INFO1 may be stored in at least one memory block MEMORY BLOCK<2> in the memory device 150, in a nonvolatile state. Also, some first map information SOME L2P MAP INFO1 of the entire first map information L2P MAP INFO1 stored in the memory device 150 may be stored in the memory 144 in the controller 130. Further, some second map information L2P MAP INFO2 of the entire first map information L2P MAP INFO1 stored in the memory device 150 may be transmitted to the host 102 and be stored in the host memory 106. The some first map information SOME L2P MAP INFO1 and the second map information L2P MAP INFO2 may not overlap each other. After transmitting the second map information L2P MAP INFO2 to the host 102, the controller 130 may generate log information OUT_INFO of L2P MAP INFO2 on the second map information L2P MAP INFO2.

While FIG. 2 illustrates that the log information OUT_INFO of L2P MAP INFO2 on the second map information L2P MAP INFO2 is stored in the memory 144, this is only a example. In practice, the log information OUT_INFO of L2P MAP INFO2 on the second map information L2P MAP INFO2 may be stored in the memory 144 and at the same time may be stored in a specific memory block of the memory device 150 in a nonvolatile state.

Figure 3:
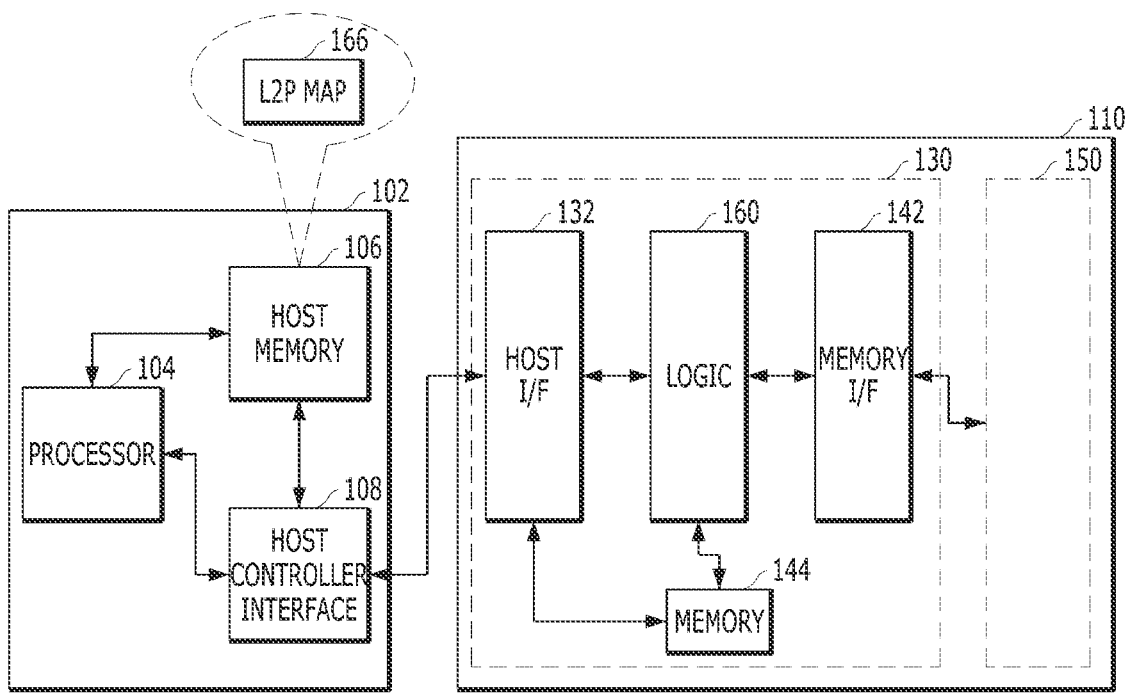
FIG. 3 is a diagram illustrating the configurations of a host and the memory system in the data processing system in accordance with the embodiment of the disclosure.

FIG. 3 is a diagram illustrating the configurations of the host 102 and the memory system 110 in the data processing system in accordance with the embodiment of the disclosure.

Figure 4:
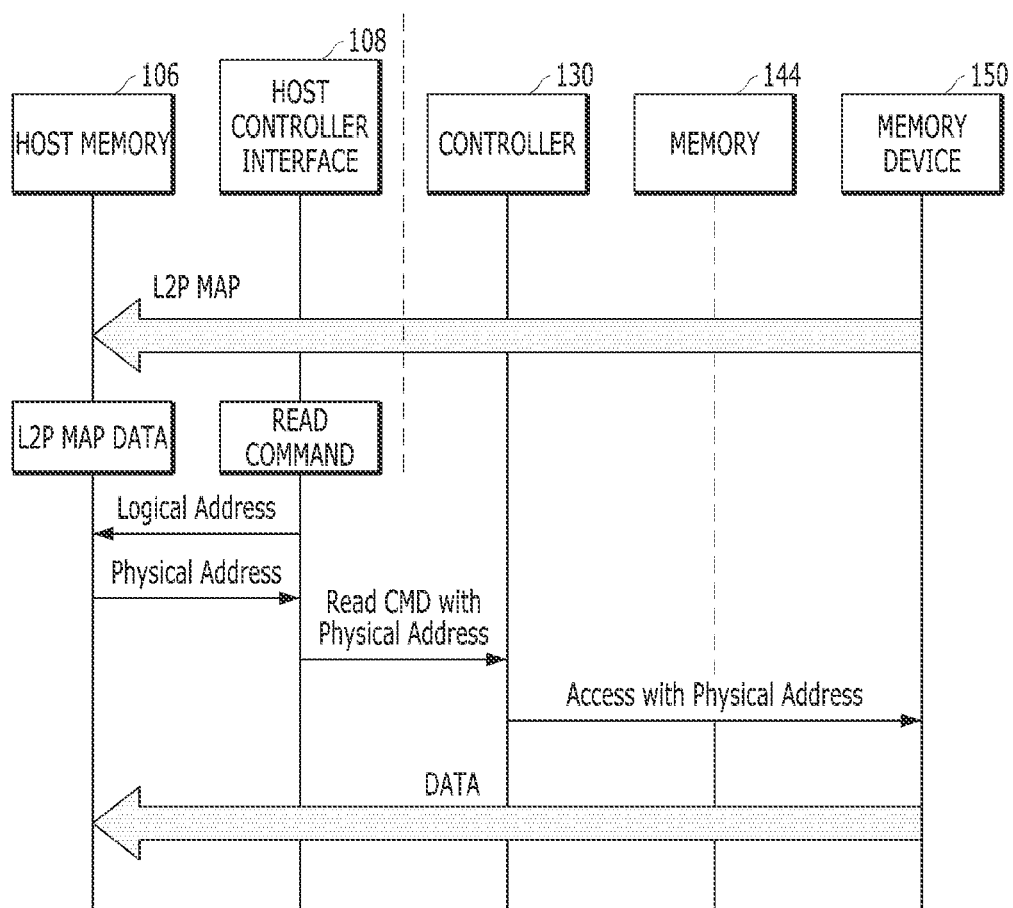
FIG. 4 is a diagram illustrating a read operation of the host and the memory system in the data processing system in accordance with the embodiment of the disclosure.

FIG. 4 is a diagram illustrating a read operation of the host 102 and the memory system 110 in the data processing system in accordance with the embodiment of the disclosure.

Referring to FIG. 4, the host 102 may include a processor 104, a host memory 106, and a host controller interface 108. The memory system 110 may include a controller 130 and a memory device 150. Herein, the controller 130 and the memory device 150 described with reference to FIG. 4 may correspond to the controller 130 and the memory device 150 described with reference to FIGS. 2 and 3.

Hereinafter, a difference between the controller 130 and the memory device 150 shown in FIG. 4 and the controller 130 and the memory device 150 shown in FIGS. 2 and 3, which can technically be distinguished, is mainly described. Particularly, a logic block 160 in the controller 130 may correspond to the flash translation layer (FTL) 40 described with reference to FIG. 4. However, according to an embodiment, the logic block 160 may perform an additional function not described in the flash translation layer (FTL) 40 shown in FIG. 3.

The host 102 may include the processor 104, which has a higher performance than that of the memory system 110. Furthermore, the host memory 106 is capable of storing a larger amount of data than that of the memory system 110 which cooperates with the host 102. The processor 104 and the host memory 106 may have an advantage in terms of space and upgradability. For example, the processor 104 and the host memory 106 may have less of a space limitation than the processor 134 and the memory 144 in the memory system 110. The processor 104 and the host memory 106 may be replaceable in order to upgrade their performance, which is distinguishable from the processor 134 and the memory 144 in the memory system 110. In the embodiment, the memory system 110 may utilize the resources possessed by the host 102 in order to increase the operation efficiency of the memory system 110.

As an amount of data which can be stored in the memory system 110 increases, an amount of metadata corresponding to the data stored in the memory system 110 also increases. When storage capability used to load the metadata in the memory 144 is limited, the increase in an amount of loaded metadata may cause a burden on operations of the controller 130. For example, because of a space limitation allocated for metadata in the memory 144, a part, but not all, of the metadata may be loaded. If the loaded metadata does not include specific metadata for a physical location which the host 102 intends to access and some of the loaded metadata has been updated, the controller 130 must store the loaded metadata back into the memory device 150 and load the specific metadata for the physical location which the host 102 intends to access. These operations should be performed in order for the controller 130 to perform a read operation or a write operation required by the host 102, and may degrade performance of the memory system 110.

Storage capability of the host memory 106 in the host 102 may be tens or hundreds of times greater than that of the memory 144 in the controller 130. The memory system 110 may transfer metadata (i.e., L2P map) 166 used by the controller 130 to the host memory 106 so that at least some part of the host memory 106 may be accessed by the memory system 110. The some part of the host memory 106 may be used as a cache memory for address translation required for reading or writing data in the memory system 110. In this case, the host 102 translates a logical address into a physical address based on the metadata 166 stored in the host memory 106. Then, the host 102 may transmit the translated physical address with the request, the command, or the instruction to the memory system 110. The memory system 110 may receive the translated physical address with the request, the command, or the instruction, may skip an internal process of translating the logical address into the physical address and may access the memory device 150 based on the physical address. In this case, an overhead (e.g., operational burden) of the controller 130 loading metadata from the memory device 150 may be gone, and operational efficiency of the memory system 110 may be enhanced.

Even if the memory system 110 transmits the metadata 166 to the host 102, the memory system 110 may control processing (e.g., generation, deletion and update of metadata) of mapping information based on the metadata 166. The controller 130 may perform a predetermined operation according to an operation state of the memory device 150. Further, the controller 130 may determine a physical address in the memory device 150 to store data from the host 102. Because a physical address in the memory device 150 may be changed and the host 102 has not recognized the changed physical address, the memory system 110 may control the metadata 166 initially.

While the memory system 110 controls metadata used for the address translation, it can be determined that the memory system 110 needs to modify or update the metadata 166 previously transmitted to the host 102. The memory system 110 may send a signal or metadata to the host 102 to request the update of the metadata 166 stored in the host 102. The host 102 may update the stored metadata 166 in the host memory 106 in response to a request from the memory system 110. This allows the metadata 166 stored in the host memory 106 to be kept as the latest version such that, even though the host controller interface 108 uses the metadata 166 stored in the host memory 106, there is no concern in an operation in which a logical address is translated into a physical address and the translated physical address is transmitted along with the logical address to the memory system 110.

Referring to FIGS. 1 to 3 together, the predetermined operation that may be performed in the memory system 110 means an operation of moving valid data stored in at least one first memory block of the plurality of memory blocks 152, 154 and 156 in the memory device 150, to at least one second memory block. For example, the predetermined operation may include a background operation such as, garbage collection and wear leveling.

The metadata 166 stored in the host memory 106 may include mapping information used for translating a logical address into a physical address. Referring to FIG. 3, metadata may include two distinguishable items: logical/physical (L2P) information used for translating a logical address into a physical address; and physical/logical (P2L) information used for translating a physical address into a logical address. The metadata 166 stored in the host memory 106 may include the logical/physical information. The physical/logical information may be primarily used for internal operations of the memory system 110, but might not be used for operations requested by the host 102 to store data in the memory system 110 or to read data corresponding to a particular logical address from the memory system 110. Depending on an embodiment, the physical/logical information might not be transmitted by the memory system 110 to the host 102.

The logical/physical information may correspond to the first map information L2P MAP INFO1 described above with reference to FIG. 2. The metadata 166 stored in the host memory 106 may correspond to the second map information L2P MAP INFO2 described above with reference to FIG. 2.

The controller 130 may control processing on the logical/physical information or the physical/logical information, and store either the logical/physical information or the physical/logical information to the memory device 150. Since the host memory 106 is a type of volatile memory, the metadata 166 stored in the host memory 106 may disappear when an event such as interruption of power supply to the host 102 and the memory system 110 occurs. Accordingly, the controller 130 might not only keep the latest state of the metadata 166 stored in the host memory 106, but may also store the latest state of the logical/physical information or the physical/logical information in the memory device 150.

Referring to FIGS. 3 and 4, an operation requested by the host 102 to read data stored in the memory system 110 is described when the metadata 166 is stored in the host memory 106.

When power is supplied to the host 102 and the memory system 110, the host 102 and the memory system 110 may be engaged with each other. When the host 102 and the memory system 110 cooperate, the metadata (L2P MAP) stored in the memory device 150 may be transferred to the host memory 106.

When a read command (Read CMD) is issued by the processor 104 in the host 102, the read command is transmitted to the host controller interface 108. After receiving the read command, the host controller interface 108 searches for a physical address corresponding to a logical address corresponding to the read command in the metadata (L2P MAP) stored in the host memory 106. Based on the metadata (L2P MAP) stored in the host memory 106, the host controller interface 108 may recognize the physical address corresponding to the logical address. The host controller interface 108 carries out an address translation for the logical address associated with the read command.

The host controller interface 108 transfers the read command (Read CMD) with the logical address as well as the physical address to the controller 130. The controller 130 may access the memory device 150 based on the physical address received with the read command (Read CMD). Data stored at a location corresponding to the physical address in the memory device 150 may be transferred to the host memory 106.

An operation of reading data stored in the memory device 150 including a nonvolatile memory may take more time than an operation of reading data stored in the host memory 106 which is a volatile memory. In the above-described operation for handling the read command (Read CMD), the controller 130 may skip an address translation corresponding to the logical address received from the host 102 (e.g., searching for and recognizing a physical address associated with the logical address). For example, in the address translation, the controller 130 might not have to load metadata from the memory device 150 or replace the metadata stored in the memory 144 when the controller 130 cannot find metadata for the address translation in the memory 144. This allows the memory system 110 to perform a read operation requested by the host 102 more quickly.

Figure 5:
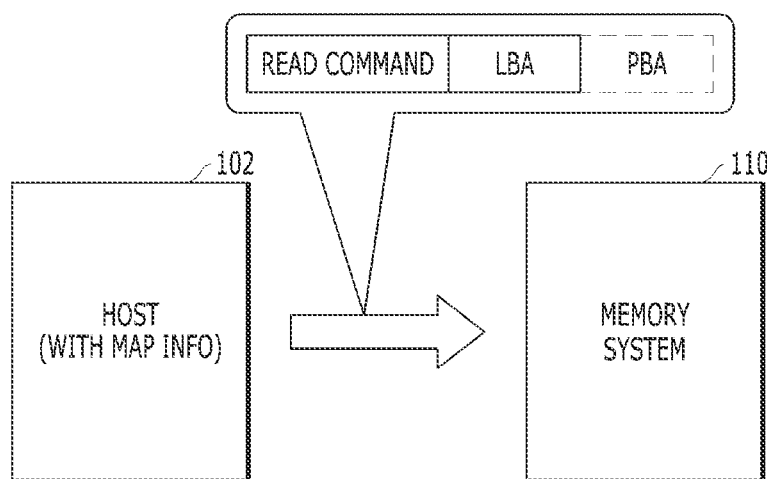
FIG. 5 is a diagram illustrating a first example of a transaction of the host and the memory system in the data processing system in accordance with the embodiment of the disclosure.

FIG. 5 illustrates a first example of a transaction between a host 102 and a memory system 110 in a data processing system according to an embodiment of the present disclosure.

Referring to FIG. 5, the host 102, which stores the map information (MAP INFO), may transmit a read command with a logical address LBA and a physical address PBA to the memory system 110. When a physical address PBA corresponding to a logical address LBA, which is to be transmitted with a read command (READ COMMAND) to the memory system 110 is found in the map information stored in the host 102, the host 102 may transmit the read command (READ COMMAND) with the logical address LBA and the physical address PBA to the memory system 110. However, when the physical address PBA corresponding to the logical address LBA is not found in the map information stored in the host 102, the host 102 may send the read command (READ COMMAND) including only the logical address LBA without the physical address PBA to the memory system 110.

Although FIG. 5 describes an operation in response to the read command (READ COMMAND) as an example, an embodiment of the present disclosure may be applied to a write command or an erase command which the host 102 may transfer to the memory system 110.

Figure 6:
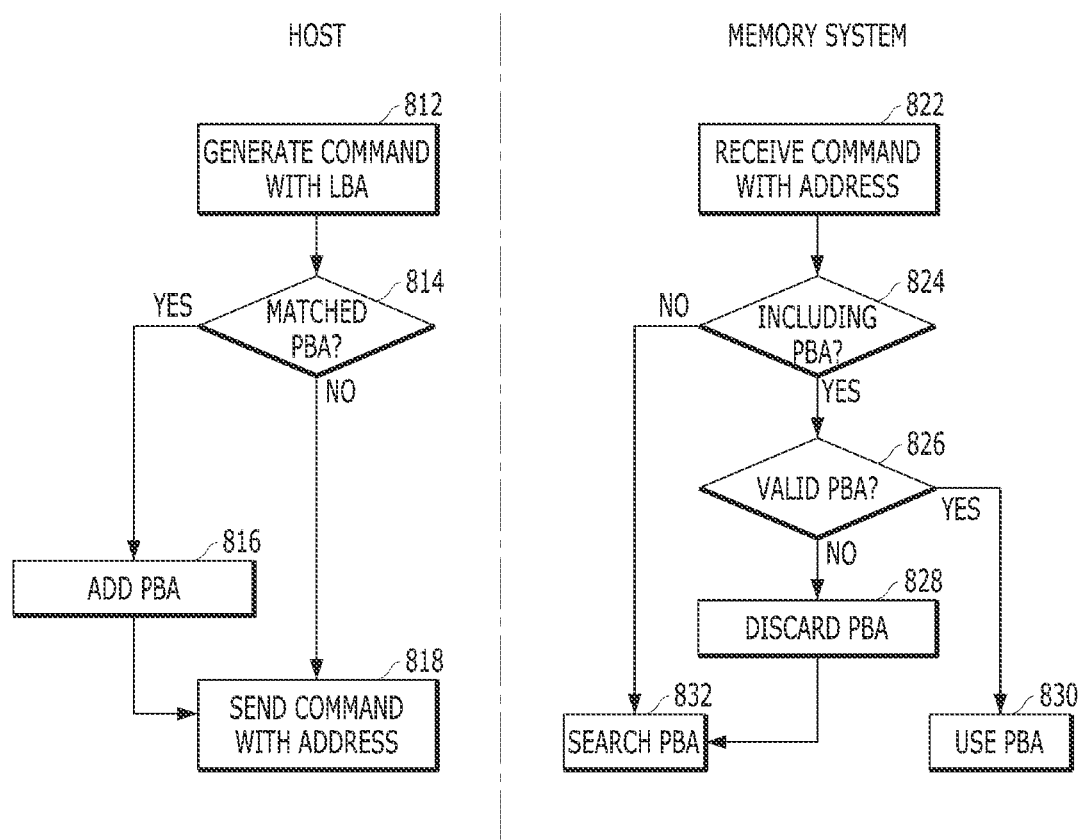
FIG. 6 is a diagram illustrating a first operation of the host and the memory system in accordance with the embodiment of the disclosure.

FIG. 6 illustrates a first operation of a host and a memory system according to an embodiment of the present disclosure. FIG. 6 illustrates detailed operations of the host transmitting a command including a logical address LBA and a physical address PBA, and the memory system receiving the command with the logical address LBA and the physical address PBA, like the host 102 and the memory system 110 described with reference to FIG. 5.

Referring to FIG. 6, the host may generate a command COMMAND including a logical address LBA (step 812). Thereafter, the host may check whether a physical address PBA corresponding to the logical address LBA is in the map information stored therein (step 814). If there is no physical address PBA (NO in step 814), the host may transmit a command COMMAND with the logical address LBA and without the physical address PBA (step 818).

If there is a physical address PBA (YES of step 814), the host may add the physical address PBA to the command COMMAND with the logical address LBA (step 816). The host may send the command COMMAND with the logical address LBA and the physical address PBA (step 818).

The memory system may receive a command (step 822). The memory system may check whether the command is received with a physical address PBA (step 824). When the command is not received with a physical address PBA (NO in step 824), the memory system may perform a mapping operation or an address translation, e.g., search for a physical address corresponding to the logical address received with the command (step 832).

When the command is received with the physical address PBA (YES of step 824), the memory system may check whether the physical address PBA is valid (step 826). The memory system has delivered the map information to the host, and the host may perform the mapping operation based on the map information delivered from the memory system, to transmit the command with the physical address PBA to the memory system. However, after the memory system transmits map information to the host, the map information may be changed and updated by the memory system. When map information is dirty, the physical address PBA received from the host might not be used to access data as it is, so the memory system may determine whether the physical address PBA received with the command is valid, i.e., whether map information corresponding to the physical address PBA is changed or updated. When the physical address PBA received with the command is valid (YES at step 826), the memory system may perform an operation corresponding to the command using the physical address PBA (step 830).

When the physical address PBA received with the command is not valid (NO in step 826), the memory system may ignore the physical address PBA received with the command (step 828). In this case, the memory system may search for a physical address PBA based on the logical address LBA received with the command (step 832).

Figure 7:
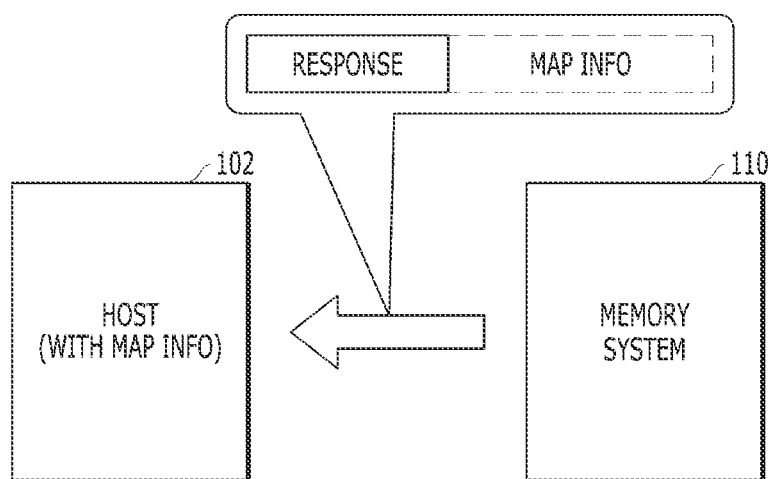
FIG. 7 is a diagram illustrating a second example of a transaction of the host and the memory system in the data processing system in accordance with the embodiment of the disclosure.

FIG. 7 illustrates a second example of a transaction between a host 102 and a memory system 110 in a data processing system according to an embodiment of the present disclosure.

Referring to FIG. 7, the memory system 110 may transfer map information (MAP INFO) to the host 102. The memory system 110 may use a response RESPONSE regarding the command of the host 102 to transfer the map information (MAP INFO). Herein, the response RESPONSE is a type of message or packet which is transmitted after the memory system 110 completely performs an operation in response to a command received from the host 102.

In an embodiment, there may be no particular limitation on a response for transmitting map information. For example, the memory system 110 may transmit the map information to the host 102 by using a response corresponding to a read command, a write command, or an erase command.

The memory system 110 and the host 102 may exchange a command or a response with each other in a specific format set according to a predetermined protocol. For example, a format of the response RESPONSE may include a basic header, a result (or a state) according to success or failure of the command received from the host 102, and additional information indicating an operational state of the memory system 110. The memory system 110 may add (or insert)

map information (MAP INFO) into the format of the response RESPONSE to transmit the map information to the host 102.

Figure 8:
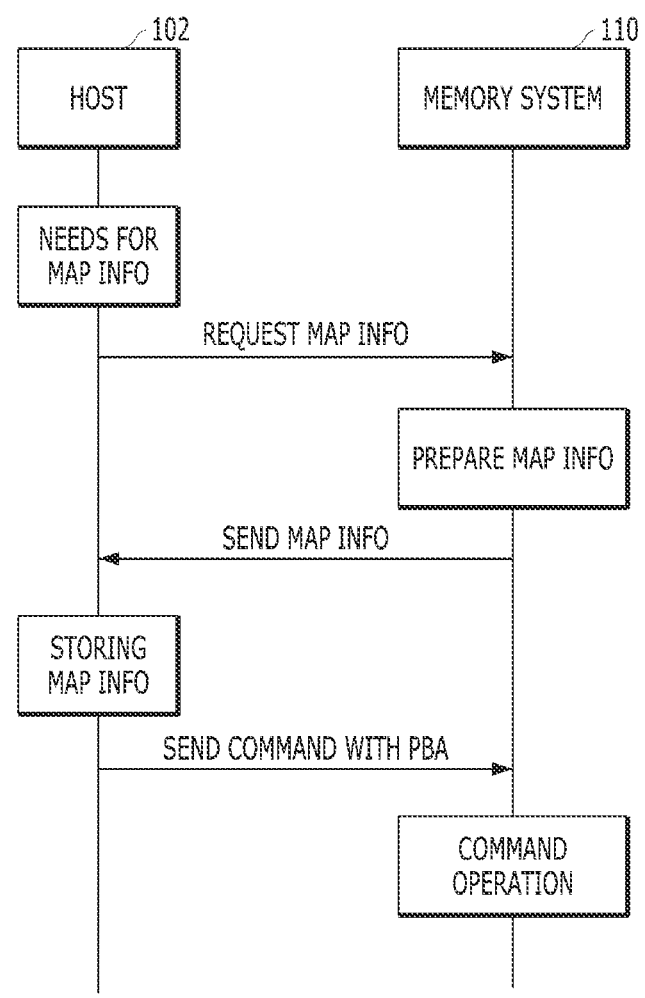
FIG. 8 is a diagram illustrating a second operation of the host and the memory system in accordance with the embodiment of the disclosure.

FIG. 8 illustrates a second operation between a host and a memory system according to an embodiment of the present disclosure. Specifically, FIG. 8 illustrates an operation where the host 102 first requests map information to the memory system 110 and then the memory system 110 transmits map information in response to a request of the host 102.

Referring to FIG. 8, a need for map information may occur at the host 102. For example, if the host 102 can allocate a space to store map information, or if the host 102 expects faster data input/output (I/O) of the memory system 110, the host 102 may request the map information to the memory system 110. In addition, a need for the map information may also be generated by the host 102 at a user's request.

The host 102 may request map information to the memory system 110. The memory system 110 may prepare the map information in response to the request from the host 102. In an embodiment, the host 102 may request specific map information such as a specific range of map information from the memory system 110. In another embodiment, the host 102 may generally request map information from the memory system 110, and the memory system 110 may determine which map information is provided to the host 102.

After the memory system 110 sends prepared map information to the host 102, the host 102 may store the map information in an internal storage space, e.g., the host memory 106 described with reference to FIGS. 2 and 3.

Using the stored map information, the host 102 may add the physical address PBA in a format of a command COMMAND and send the format of the command COMMAND with the physical address PBA to the memory system 110. Then, the memory system 110 may use the physical address PBA received with the command COMMAND from the host 102 to perform an operation corresponding to the command COMMAND.

Figure 9:
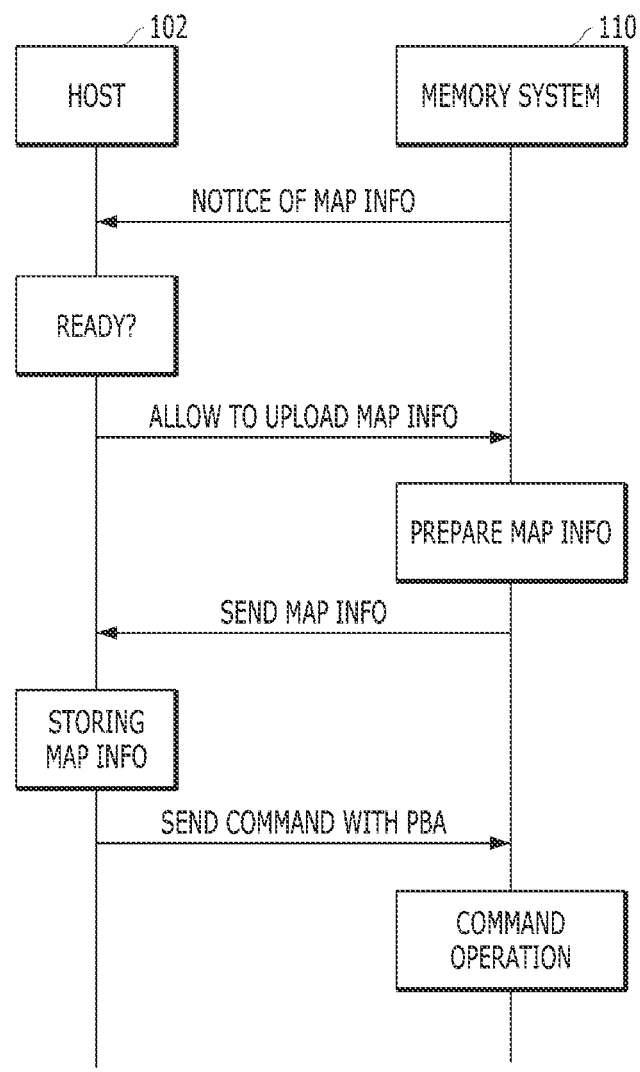
FIG. 9 is a diagram illustrating a third operation of the host and the memory system in accordance with the embodiment of the disclosure.

FIG. 9 illustrates a third operation between a host and a memory system according to an embodiment of the present disclosure. Specifically, FIG. 9 illustrates an operation where the memory system 110 inquires the host 102 for transmitting map information, the host 102 determines whether to allow transmission from the memory system 110, and the host 102 receives the map information in response to the inquiry of the memory system 110.

Referring to FIG. 9, the memory system 110 may notify the host 102 of transmitting map information. The host 102 may determine whether the host 102 can store the map information associated with the notification regarding transmission of the map information, which is delivered from the memory system 110. If the host 102 can receive and store the map information received from the memory system 110, the host 102 may allow the memory system 100 to transfer the map information. According to an embodiment, the memory system 110 may prepare map information to be transmitted, and then transmit the prepared map information to the host 102.

The host 102 may store the received map information in an internal storage space (e.g., the memory 106 described with reference to FIGS. 2 and 3). The host 102 may generate a command with a physical address PBA, which are to be transmitted to the memory system 110, after performing a mapping operation based on the stored map information.

The memory system 110 may check whether the physical address PBA is included in the command from the host 102, and apply the physical address PBA to perform an operation corresponding to the command.

Regarding the transmission of the map information, FIG. 8 illustrates that the host 102 may initially perform the operation between the host 102 and the memory system 110 described with reference to FIG. 8. In contrast, FIG. 9 illustrates that the memory system 110 may initially perform the operation between the host 102 and the memory system 110. In other embodiments, the memory system 110 may perform the transmission of the map information differently. According to an operational condition or environment, the memory system 102 and the host 110 may selectively use a method for transmitting map information described with reference to FIGS. 8 and 9.

Figure 10:
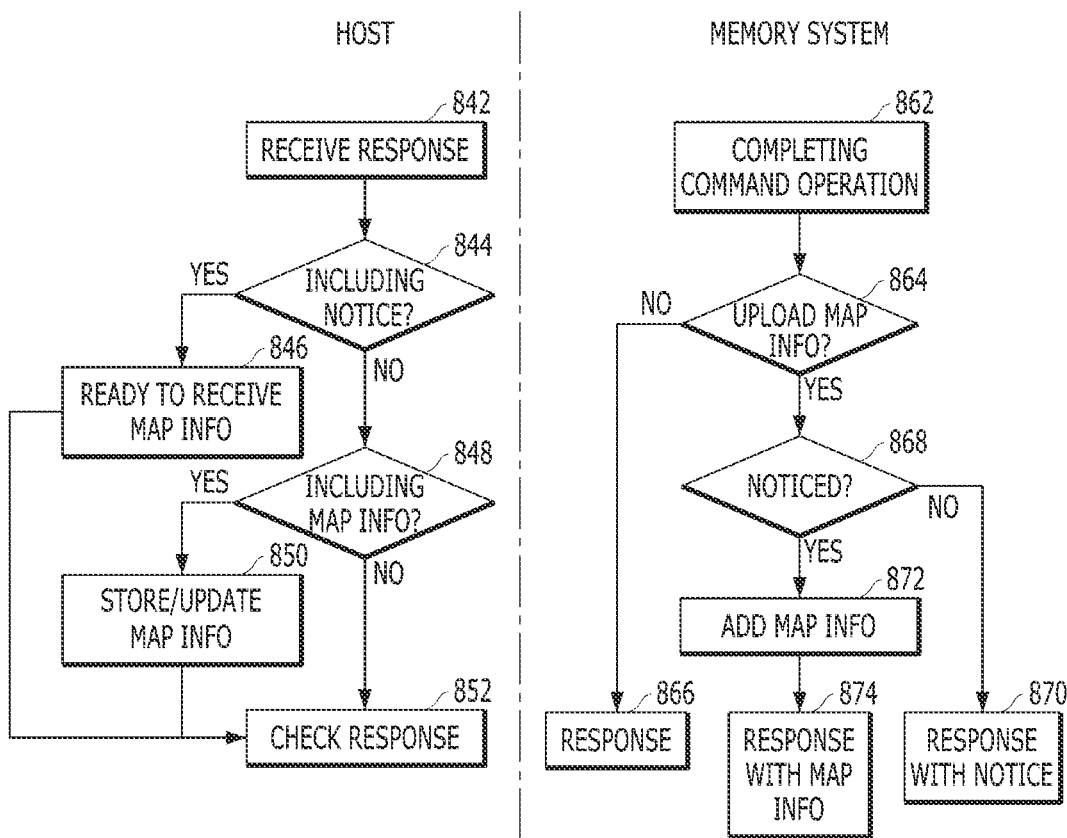
FIG. 10 is a diagram illustrating a fourth operation of the host and the memory system in accordance with the embodiment of the disclosure.

FIG. 10 illustrates a fourth operation between a host and a memory system according to an embodiment of the present disclosure. In detail, FIG. 10 illustrates a case where the memory system attempts to transmit map information to the host while the host and the memory system are operatively engaged with each other.

Referring to FIG. 10, the memory system may determine whether an operation corresponding to a command received from a host is completed (step 862). After the operation corresponding to the command is completed, the memory system may check whether there is map information to be transmitted (i.e., uploaded) to the host before transmitting a response corresponding to the command (step 864). If there is no map information to be transmitted to the host (NO in step 864), the memory system may transmit a response RESPONSE including information (e.g., success or failure) regarding whether the operation corresponding to the command from the host has completed (step 866).

When the memory system recognizes map information to be transmitted to the host (YES of step 864), the memory system may check whether a notice NOTICE for transmitting the map information has been made (step 868). The notification may be similar to that described with reference to FIG. 10. When the memory system is to send the map information but the notification regarding the memory system sending the map information to the host has not been made in advance (NO of step 868), the memory system may add the notice NOTICE to the response RESPONSE. In addition, the memory system may transmit the response RESPONSE with the notice NOTICE to the host (step 870).

When the notice NOTICE for inquiring transmission of the map information has already been made (YES of step 868), the memory system may add the map information to the response RESPONSE (step 872). Thereafter, the memory system may transmit a response with the map information (step 874). According to an embodiment, the host may send permission for transmitting the map information to the memory system before the memory system transmits the map information to the host.

The host may receive at least one of the response RESPONSE, the response including the notice (RESPONSE WITH NOTICE), and the response including the map information (RESPONSE WITH MAP INFO.), from the memory system (step 842).

The host may verify whether the received response includes the notice (step 844). If the received response includes the notice (YES of step 844), the host may prepare to receive and store map information that may be delivered later (step 846). Thereafter, the host may check the response corresponding to a command previously transmitted to the memory system (step 852). For example, the host may check the response to confirm whether an operation corresponding to a command previously sent has succeeded or failed in the memory system.

When the received response does not include the notice (NO of step 844), the host may determine whether the response includes map information (step 848). When the response does not include map information (NO of step 848), the host may check the response corresponding to the command previously transmitted to the memory system (step 852).

When the received response includes map information (YES of step 848), the host may store the map information in the response within a storage space (e.g., a host memory 106 of FIG. 3) or update the map information already stored in the storage space (step 850). Then, the host may check the response corresponding to the command previously transmitted to the memory system (step 852).

Figure 11A:
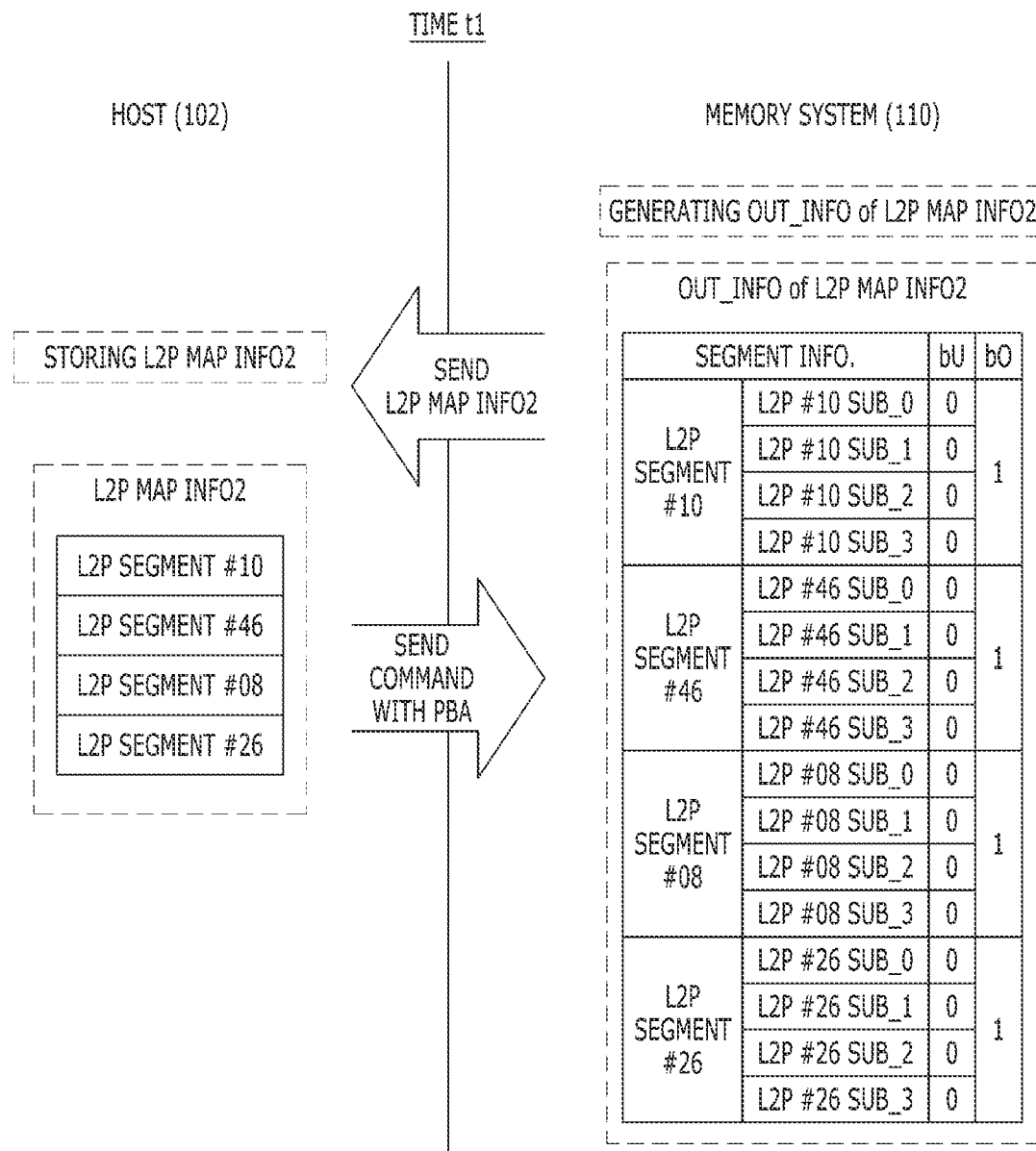
FIGS. 11A to 11C are diagrams illustrating a first operation in which the host and the memory system share map information in accordance with the embodiment of the disclosure.
Figure 11B:
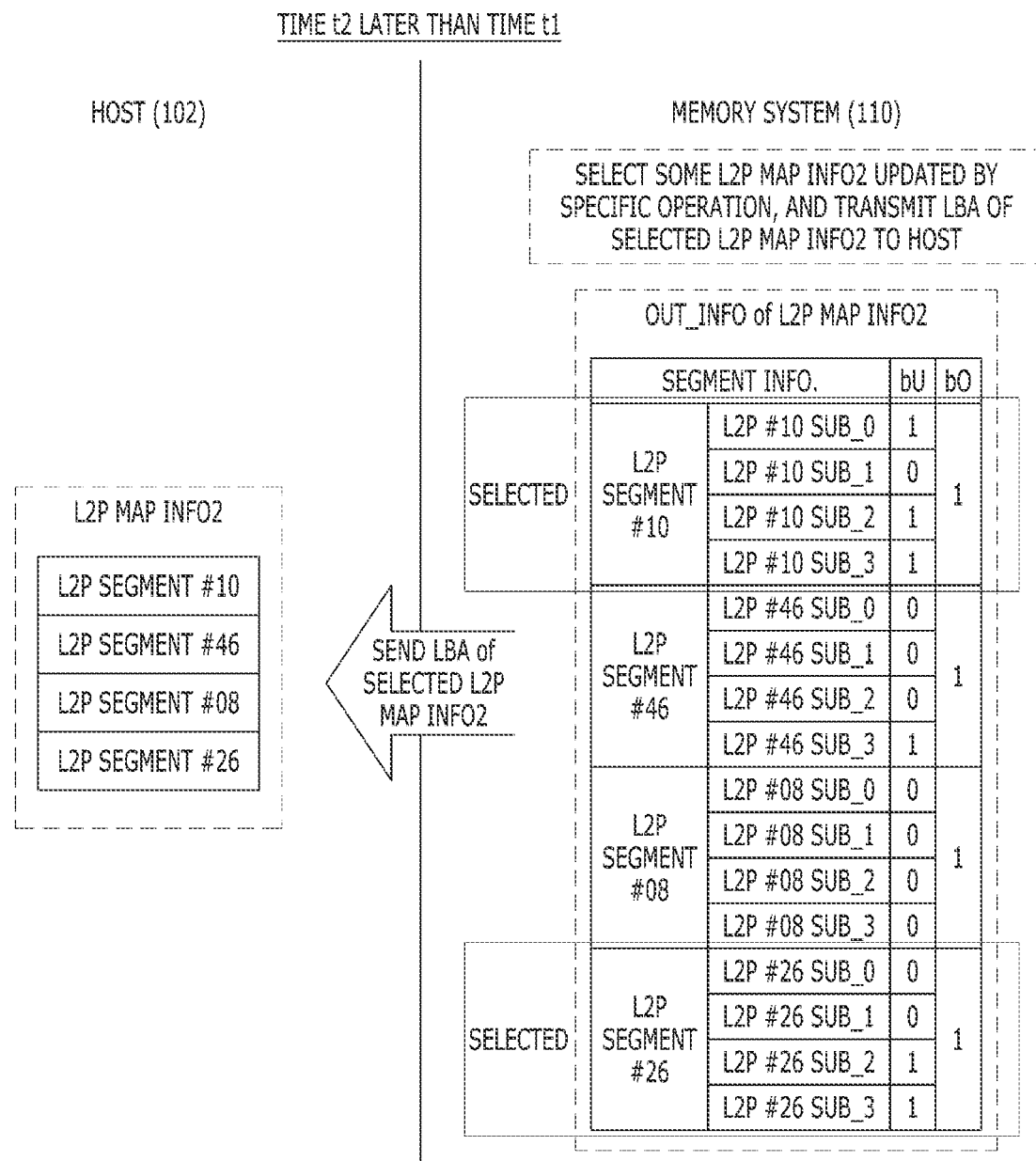
Figure 11C:
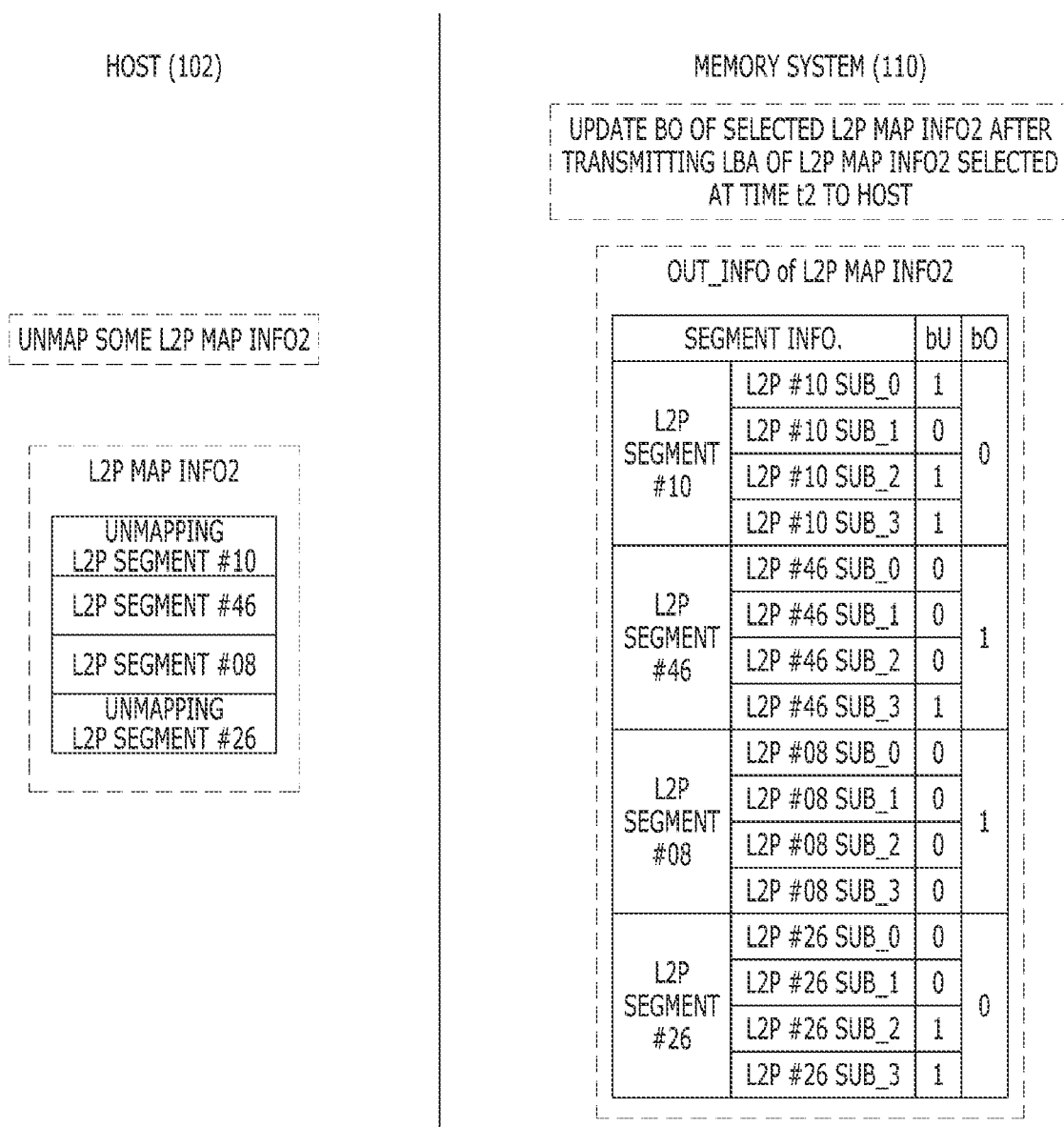

FIGS. 11A to 11C are diagrams illustrating a first operation in which the host 102 and the memory system 110 share map information in accordance with the embodiment of the disclosure.

FIG. 11A may illustrate an operation of sharing map information between the host 102 and the memory system 110 at a time t1, FIG. 11B may illustrate an operation of sharing map information between the host 102 and the memory system 110 at a time t2, and FIG. 11C may illustrate an operation of sharing map information between the host 102 and the memory system 110 at a time t3.

At the time t1, second map information L2P MAP INFO2 newly generated by the memory system 110 is transferred to and stored in the host 102 and thus the host 102 and the memory system 110 share the second map information L2P MAP INFO2 for the first time. Therefore, at the time t1, the second map information L2P MAP INFO2 which is shared by the host 102 and the memory system 110 may be in a state in which it is not updated. At the time t2 later than the time t1, only the second map information L2P MAP INFO2 stored in the memory system 110 includes some updated map information as a predetermined operation is performed and the host 102 is not aware of the fact that the some map information of the second map information L2P MAP INFO2 is updated. At the time t3 later than the time t2, the host 102 is aware of the fact that the some map information of the second map information L2P MAP INFO2 is updated and unmaps the updated some map information of the second map information L2P MAP INFO2 stored in the host 102.

Referring to FIG. 11A, at the time t1, the controller 130 may generate first map information L2P MAP INFO1 to map a physical address in the memory device 150 to a logical address from the host 102. Also, at the time t1, the controller 130 may output the some second map information L2P MAP INFO2 of the first map information L2P MAP INFO1 to the host 102 (SEND L2P MAP INFO2). Further, at the time t1, corresponding to the output of the second map information L2P MAP INFO2 to the host 102, the controller 130 may generate log information OUT_INFO of L2P MAP INFO2 on the second map information L2P MAP INFO2 (GENERATING OUT_INFO of L2P MAP INFO2). Moreover, at the time t1, the host 102 may store the second map information L2P MAP INFO2 received from the memory system 110, in the host memory 106 (STORING L2P MAP INFO2). After the time t1, the host 102 may generate a physical address and a command to be transferred to the memory system 110, based on the second map information L2P MAP INFO2. Further, the host 102 may send the command with the physical address to the memory system 110 (SEND COMMAND WITH PBA). That is, based on a logical address to be transferred to the memory system 110, the host 102 may find a physical address corresponding to the logical address, in the second map information L2P MAP INFO2 stored therein. If the physical address exists, the host 102 may transfer the command with the logical address and the physical address to the memory system 110. If the physical address does not exist, the host 102 may transfer the command with the logical address to the memory system 110. The memory system 110 may receive the command with the physical address from the host 102 and may perform a command operation corresponding to the command. For example, when the host 102 transfers the physical address corresponding to a read command, the controller 130 may access and output data using the corresponding physical address, thereby reducing a time required for the command operation corresponding to the read command.

The second map information L2P MAP INFO2 may be managed in the unit of a map segment. That is, a plurality of map segments may be included in the second map information L2P MAP INFO2, and the second map information L2P MAP INFO2 to be outputted to the host 102 from the memory system 110 may include at least one map segment. The log information OUT_INFO of L2P MAP INFO2 on the second map information L2P MAP INFO2 may also be generated in a form for identifying a map segment. For example, the second map information L2P MAP INFO2 may include four map segments L2P SEGMENT #10, L2P SEGMENT #46, L2P SEGMENT #08 and L2P SEGMENT #26. Therefore, the log information OUT_INFO of L2P MAP INFO2 may also be generated in a form for identifying a map segment.

Further, when generating the log information OUT_INFO of L2P MAP INFO2 on the second map information L2P MAP INFO2, the controller 130 may generate output information bO corresponding to the four map segments L2P SEGMENT #10, L2P SEGMENT #46, L2P SEGMENT #08 and L2P SEGMENT #26. In other words, through the output information bO, the controller 130 may indicate which map segment of the four map segments L2P SEGMENT #10, L2P SEGMENT #46, L2P SEGMENT #08 and L2P SEGMENT #26 in the second map information L2P MAP INFO2 is outputted to the host 102 and which map segment is not outputted to the host 102. For example, in the drawing, a map segment of which the value of the output information bO is '1' is outputted to the host 102 and a map segment of which the value of the output information bO is '0' is not outputted to the host 102. Unlike the illustration of the drawing, after the four map segments L2P SEGMENT #10, L2P SEGMENT #46, L2P SEGMENT #08 and L2P SEGMENT #26 of a plurality of map segments (not illustrated) in the first map information L2P MAP INFO1 are identified as the second map information L2P MAP INFO2, before the four map segments L2P SEGMENT #10, L2P SEGMENT #46, L2P SEGMENT #08 and L2P SEGMENT #26 are outputted to the host 102. Here, the values of all of the four output information bO corresponding to the four map segments L2P SEGMENT #10, L2P SEGMENT #46, L2P SEGMENT #08 and L2P SEGMENT #26 in the second map information L2P MAP INFO2 may be '0' indicating 'not outputted.' Thus, the controller 130 may identify all of the four map segments L2P SEGMENT #10, L2P SEGMENT #46, L2P SEGMENT #08 and L2P SEGMENT #26 in the second map information L2P MAP INFO2, as output map segments, by referring to the four output information bO. Then, each time at least one map segment identified as an output map segment of the four map segments L2P SEG- MENT #10, L2P SEGMENT #46, L2P SEGMENT #08 and L2P SEGMENT #26 in the second map information L2P MAP INFO2 is outputted to the host 102, the controller 130 may update a value of output information bO corresponding to the at least one map segment identified as an output map segment outputted to the host 102, to '1' indicating 'outputted.' Therefore, since in FIG. 11A all of the four map segments L2P SEGMENT #10, L2P SEGMENT #46, L2P SEGMENT #08 and L2P SEGMENT #26 in the second map information L2P MAP INFO2 are transmitted to the host 102, it may be seen that the values of all the four output information bO corresponding to the four map segments L2P SEGMENT #10, L2P SEGMENT #46, L2P SEGMENT #08 and L2P SEGMENT #26 are '1.'

As the operation SEND L2P MAP INFO2 of outputting the second map information L2P MAP INFO2 to the host 102 from the memory system 110, the operation described above with reference to FIGS. 7 to 10 may be used.

In detail, when at least one map segment identified as an output map segment exists as a result of checking by referring to the output information bO, the controller 130 may output at least one map segment identified as an output map segment, to the host 102, which corresponds to a first command from the host 102. The first command is not limited. For example, the first command may be a read command, a write command or an erase command. According to an embodiment, the first command may be a command which is specially set for the host 102 to receive second map information from the memory system 110.

According to an embodiment, as described above with reference to FIGS. 7 and 8, after performing a command operation corresponding to the first command from the host 102, when at least one map segment identified as an output map segment exists as a result of checking by referring to the output information bO, the controller 130 may output at least one map segment identified as an output map segment, by including it in a response to the first command, which is to be outputted to the host 102. According to an embodiment, as described above with reference to FIGS. 9 and 10, when at least one map segment identified as an output map segment exists as a result of checking by referring to the output information bO, the controller 130 may notice a request for outputting the second map information L2P MAP INFO2 to the host 102. When the request for outputting the second map information L2P MAP INFO2 is noticed from the memory system 110, the host 102 may check a state of the memory 106 therein, may selectively generate the first command depending on a checking result, and may output the first command to the memory system 110. When the first command is received from the host 102 depending on a determination of the host 102, after a command operation corresponding to the first command is performed, at least one map segment identified as an output map segment may be outputted by being included in a response to the first command, which is to be outputted to the host 102. According to an embodiment, when at least two map segments are determined as output map segments, the controller 130 may output a predetermined number of map segments to the host 102 by successively including them in a response to one first command.

When generating the log information OUT_INFO of L2P MAP INFO2 on the second map information L2P MAP INFO2, the controller 130 may generate the log information OUT_INFO of L2P MAP INFO2 not only in the form for identifying map segments but also in a form for divisionally identifying four map sub-segments L2P #10 SUB_0, L2P #10 SUB_1, L2P #10 SUB_2, L2P #10 SUB_3, L2P #46 SUB_0, L2P #46 SUB_1, L2P #46 SUB_2, L2P #46 SUB_3, L2P #08 SUB_0, L2P #08 SUB_1, L2P #08 SUB_2, L2P #08 SUB_3, L2P #26 SUB_0, L2P #26 SUB_1, L2P #26 SUB_2 and L2P #26 SUB_3 of the respective four map segments L2P SEGMENT #10, L2P SEGMENT #46, L2P SEGMENT #08 and L2P SEGMENT #26. This is because: when the second map information L2P MAP INFO2 is identified in the unit of a map segment, the number of logical/physical information in one map segment may include a plurality of map information, and, when a substantially small number of logical/physical information among the plurality of map information is updated, if it is determined that the entire one map segment is updated, an inefficient operation may be caused. When a specific segment is determined to be in an updated state, the controller 130 may need to perform an operation of outputting the specific segment to the host 102 or storing the specific segment in the memory device 150. By identifying one segment through dividing it into a plurality of sub-segments to efficiently perform an operation of determining an updated state of a specific segment, the controller 130 may prevent the specific segment from being too frequently updated or outputted to the host 102.

In detail, when generating the log information OUT_INFO of L2P MAP INFO2 on the four map segments L2P SEGMENT #10, L2P SEGMENT #46, L2P SEGMENT #08 and L2P SEGMENT #26 in the second map information L2P MAP INFO2, the controller 130 may generate 16 update information bU corresponding to the 16 map sub-segments L2P #10 SUB_0, L2P #10 SUB_1, L2P #10 SUB_2, L2P #10 SUB_3, L2P #46 SUB_0, L2P #46 SUB_1, L2P #46 SUB_2, L2P #46 SUB_3, L2P #08 SUB_0, L2P #08 SUB_1, L2P #08 SUB_2, L2P #08 SUB_3, L2P #26 SUB_0, L2P #26 SUB_1, L2P #26 SUB_2 and L2P #26 SUB_3. Through the 16 update information bU, the controller 130 may indicate which map sub-segment among the 16 map sub-segments in the second map information L2P MAP INFO2 is updated and which map sub-segment is not updated. When the occupation percentage of update information bU indicating 'updated' of the four update information bO corresponding to one specific map segment is greater than or equal to a predetermined percentage, the controller 130 may determine the one specific map segment to be in an updated state. For example, in the drawing, a map sub-segment of which the value of the update information bU is '0' is not updated and a map sub-segment of which the value of the update information bU is '1' is updated. Since in FIG. 11A none of the 16 map sub-segments in the second map information L2P MAP INFO2 are updated, it may be seen that all of the 16 update information bU corresponding to the 16 map sub-segments are '0.'

When a command from the host 102 includes not only a logical address but also a physical address as a result of checking, the controller 130 may determine the validity of the physical address by referring to update information Bu, as shown in FIG. 6. For example, when a read command from the host 102 includes a first logical address and a first physical address, the controller 130 may determine the validity of the first physical address by checking the update information bU of the map sub-segment corresponding to the first logical address in the log information OUT_INFO of L2P MAP INFO2 on the second map information L2P MAP INFO2. As a result of checking the update information bU, when the update information bU has the value of '0' indicating 'not updated,' the controller 130 may determine the first physical address as valid. Therefore, the controller 130 may perform the read command from the host 102, using the first physical address. Conversely, as a result of checking the update information bU, when the update information bU has the value of '1' indicating 'updated,' the controller 130 may determine the first physical address as invalid. Therefore, the controller 130 may neglect the first physical address and search for a valid physical address corresponding to the first logical address in the first map information L2P MAP INFO1. Then, the controller 130 may perform the read command from the host 102, by using a searched valid physical address.

Referring to FIG. 11B, at the time t2 later than the time t1, the controller 130 may identify map information updated by a predetermined operation PREDETERMINED OPERATION (see FIG. 1) of the second map information L2P MAP INFO2, as third map information SELECTED L2P MAP INFO2. For example, it may be seen that, of the four map segments L2P SEGMENT #10, L2P SEGMENT #46, L2P SEGMENT #08 and L2P SEGMENT #26 in the second map information L2P MAP INFO2, the first and fourth map segments L2P SEGMENT #10 and L2P SEGMENT #26 are updated by the predetermined operation and are identified as the third map information.

In detail, in the first map segment L2P SEGMENT #10, it may be seen that, of the four map sub-segments L2P #10 SUB_0, L2P #10 SUB_1, L2P #10 SUB_2 and L2P #10 SUB_3 included therein, the values of the update information bU corresponding to the first, third and fourth map sub-segments L2P #10 SUB_0, L2P #10 SUB_2 and L2P #10 SUB_3 are '1' indicating 'updated.' Further, according to a predetermined reference (e.g., 40%), the first map segment L2P SEGMENT #10 may be determined as the third map information. In the second map segment L2P SEGMENT #46, it may be seen that, of the four map sub-segments L2P #46 SUB_0, L2P #46 SUB_1, L2P #46 SUB_2 and L2P #46 SUB_3 included therein, the value of the update information bU corresponding to the fourth map sub-segment L2P #46 SUB_3 is '1' indicating 'updated.' Further, according to the predetermined reference (e.g., 40%), the second map segment L2P SEGMENT #46 may not be determined as the third map information. In the third map segment L2P SEGMENT #08, it may be seen that the values of all of the update information bU corresponding to the four map sub-segments L2P #08 SUB_0, L2P #08 SUB_1, L2P #08 SUB_2 and L2P #08 SUB_3 included therein are '0' indicating 'not updated.' Further, according to the predetermined reference (e.g., 40%), the third map segment L2P SEGMENT #08 may not be determined as the third map information. In the fourth map segment L2P SEGMENT #26, it may be seen that, of the four map sub-segments L2P #26 SUB_0, L2P #26 SUB_1, L2P #26 SUB_2 and L2P #26 SUB_3 included therein, the values of the update information bU corresponding to the third and fourth map sub-segments L2P #26 SUB_2 and L2P #26 SUB_3 are '1' indicating 'updated.' Further, according to the predetermined reference (e.g., 40%), the fourth map segment L2P SEGMENT #26 may be determined as the third map information.

The controller 130 may output logical addresses LBA of at least one selected map segment identified as the third map information to the host 102, in response to a command from the host 102 (SEND LBA of SELECTED L2P MAP INFO2). For example, the controller 130 may output logical addresses LBA of the first and fourth map segments L2P SEGMENT #10 and L2P SEGMENT #26 which are identified as the third map information, to the host 102. At this time, the controller 130 may output logical addresses LBA of one or more selected map segments identified as the third map information, to the host 102, by grouping the logical addresses LBA in the unit of a segment. Also, the controller 130 may select logical addresses LBA of one or more selected map segments identified as the third map information, and may output selected logical addresses LBA to the host 102. Here, selecting logical addresses LBA of selected map segments in the unit of a segment may mean selecting, at once, all of a plurality of logical addresses in one segment. Conversely, selecting logical addresses LBA of selected map segments may mean selecting some logical addresses of the logical addresses included in one segment and not selecting the remaining logical addresses included in the one segment. For example, the controller 130 may output, at once, the logical addresses LBA of the first map segment L2P SEGMENT #10 of the logical addresses LBA of the first and fourth map segments L2P SEGMENT #10 and L2P SEGMENT #26 identified as the third map information, to the host 102. Then, the controller 130 may output, at once, the logical addresses LBA of the fourth map segment L2P SEGMENT #26 to the host 102. Also, the controller 130 may select logical addresses LBA of the first and fourth map segments L2P SEGMENT #10 and L2P SEGMENT #26 identified as the third map information, and output the selected logical addresses LBA to the host 102. As the operation SEND LBA of SELECTED L2P MAP INFO2 of outputting the logical addresses LBA of one or more selected map segments identified as the third map information, from the memory system 110 to the host 102, the operation described above with reference to FIGS. 7 to 10 may be used.

In detail, as described above with reference to FIG. 7, after performing a command operation corresponding to a second command from the host 102, when the third map information exists as a result of checking, the controller 130 may output logical addresses LBA of one or more selected map segments in the third map information, in the unit of a segment or one by one, by including them in a response to the second command, which is to be outputted to the host 102. The second command may not be limited. For example, the second command may be a read command, a write command or an erase command. For example, at the time t2, after performing a read operation corresponding to a read command from the host 102, the controller 130 may output the logical addresses LBA of the first and fourth map segments L2P SEGMENT #10 and L2P SEGMENT #26 identified as the third map information, in the unit of a segment or one by one, by including them in a response to the read command. For another example, at the time t2, after performing a program operation corresponding to a program command from the host 102, the controller 130 may output the logical addresses LBA of the first and fourth map segments L2P SEGMENT #10 and L2P SEGMENT #26 identified as the third map information, in the unit of a segment or one by one, by including them in a response to the program command.

In some embodiments, a predetermined flag (not illustrated) may be included in a response to the second command, which is to be outputted to the host 102 from the memory system 110, and a default value of the predetermined flag may be '0.' The controller 130 may set the predetermined flag in a response to '1,' corresponding to a logical address of the third map information in the response. After outputting the second command to the memory system 110, when the response to the second command is received from the memory system 110, the host 102 may check a state of the flag in the response to the second command. Further, the host 102 may be aware of whether a logical address is included in the response depending on a checking result.

For example, at the time t1 described above with reference to FIG. 11A, the third map information does not exist. Because of this fact, the controller 130 may continuously maintain the flag in the response to be outputted to the host 102 after performing the command operation corresponding to the second command from the host 102, at '0.' Accordingly, at the time t1, the host 102 may check that the flag in the response to the second command is in a state of '0.' Thereby, the host 102 may be aware that a logical address is not included in the response to the second command. For another example, at the time t2 described above with reference to FIG. 11B, the third map information may exist. Because of this fact, when outputting a logical address of the third map information to the host 102, the controller 130 may change the flag in the response to '1' after performing the command operation corresponding to the second command from the host 102. Accordingly, at the time t2, the host 102 may check that the flag in the response is '1.' Further, the host 102 may thereby be aware that a logical address is included in the response, and may check a value of the logical address in the response.

Referring to FIGS. 11B and 11C, after outputting logical addresses LBA of at least one selected map segment identified as the third map information to the host 102 (SEND LBA of SELECTED L2P MAP INFO2) in response to a command from the host 102 at the time t2, the controller 130 may update the value of output information bO corresponding to the at least one selected map segment identified as the third map information, to '0' indicating 'not updated,' to identify map information not selected as the third map information in the second map information L2P MAP INFO2, at the time t3. For example, after outputting the logical addresses LBA of the first and fourth map segments L2P SEGMENT #10 and L2P SEGMENT #26 identified as the third map information of the four map segments L2P SEGMENT #10, L2P SEGMENT #46, L2P SEGMENT #08 and L2P SEGMENT #26 in the second map information L2P MAP INFO2, to the host 102 at the time t2, the controller 130 may update the values of first and fourth output information bO corresponding to the first and fourth map segments L2P SEGMENT #10 and L2P SEGMENT #26, to '0,' at the time t3.

After receiving the logical addresses LBA of the third map information from the memory system 110 at the time t2, the host 102 may unmap map information corresponding to the logical addresses LBA of the third map information in the second map information L2P MAP INFO2 stored in the host memory 106 (UNMAPPING). When the logical addresses LBA of the third map information are received from the memory system 110 in the unit of a segment, the host 102 may unmap map information corresponding to the logical addresses LBA of the third map information in the second map information L2P MAP INFO2 stored in the host memory 106, in the unit of a segment. Also, when the logical addresses LBA of the third map information are received one by one from the memory system 110, the host 102 may unmap map information corresponding to the logical addresses LBA of the third map information in the second map information L2P MAP INFO2 stored in the host memory 106, one by one. In other words, while the host 102 may unmap the second map information L2P MAP INFO2 stored in the host memory 106 in the unit of a segment as illustrated in the drawing, it can be envisaged that, unlike the illustration of the drawing, the host 102 may select one by one and unmap the second map information L2P MAP INFO2 stored in the host memory 106.

Therefore, the host 102 does not use any more map information unmapped in the second map information L2P MAP INFO2 stored in the host memory 106. Namely, the host 102 may not determine any more map information unmapped in the second map information L2P MAP INFO2 stored in the host memory 106, as valid map information. Because of this fact, when transmitting a read command corresponding to unmapped map information to the memory system 110, the host 102 may transmit the read command without a physical address as described above with reference to FIG. 6. That is, the host 102 may transmit the read command including only a logical address to the memory system 110.

Figure 12A:
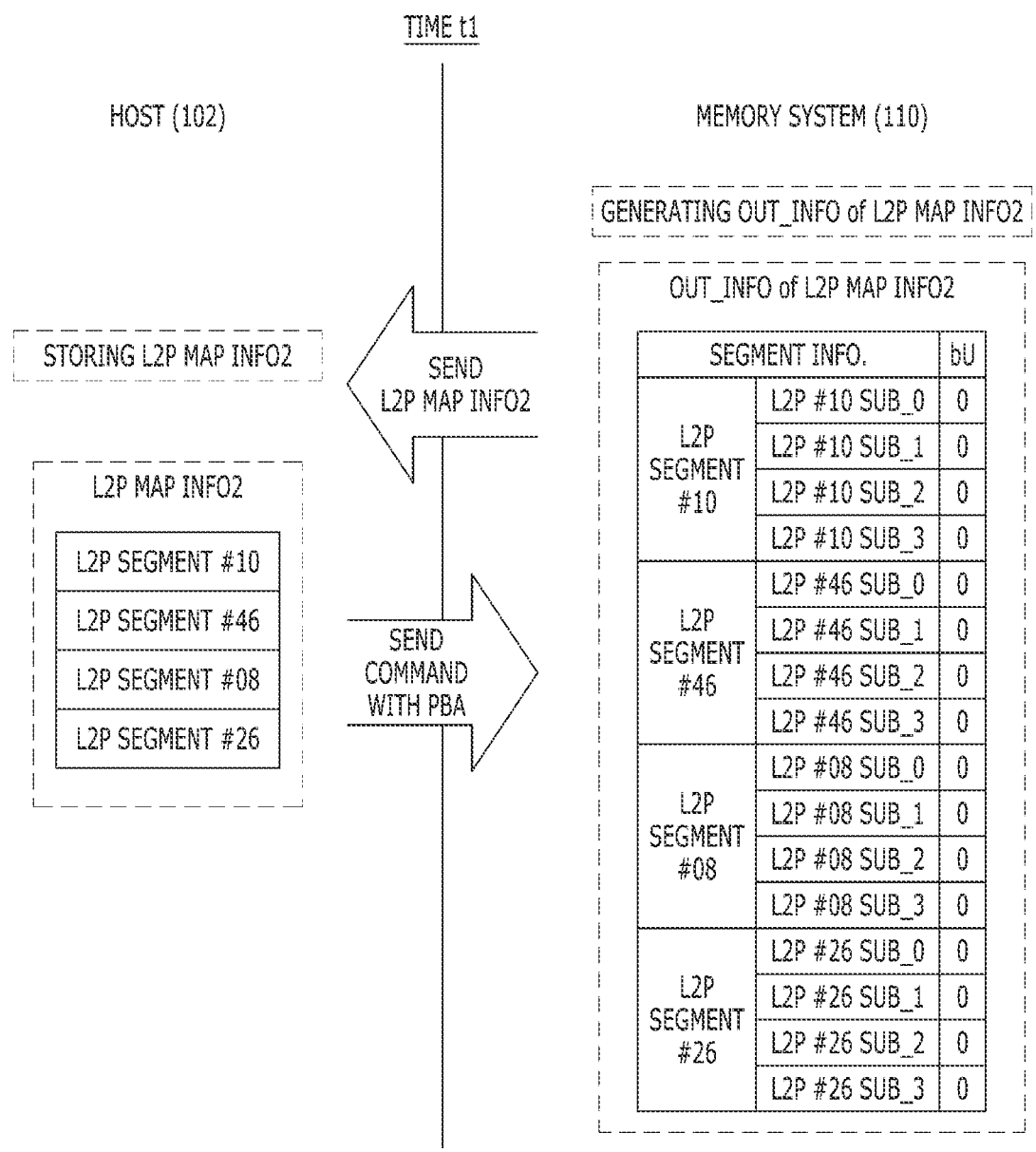
FIGS. 12A to 12C are diagrams illustrating a second operation in which the host and the memory system share map information in accordance with the embodiment of the disclosure.
Figure 12B:
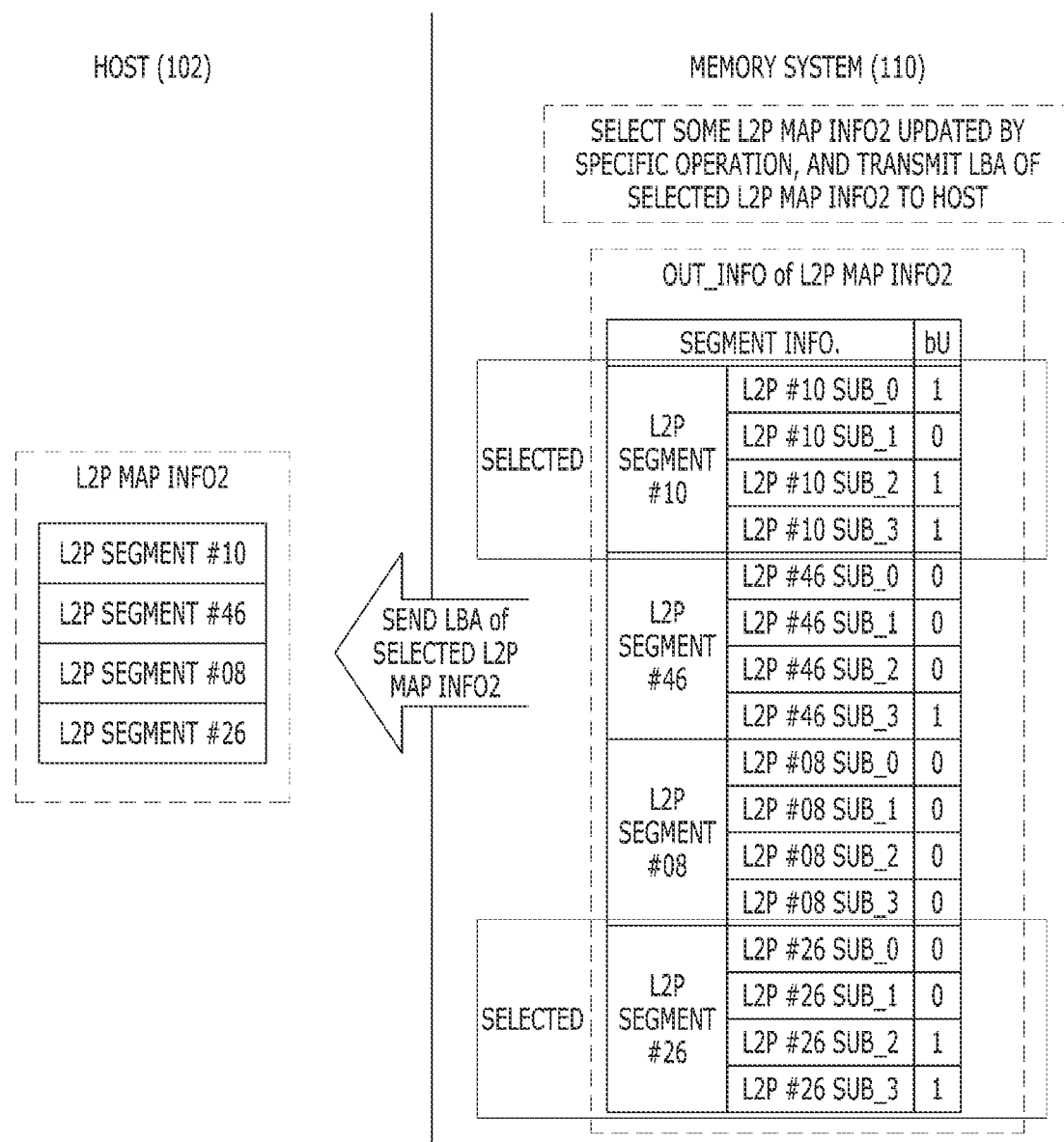
Figure 12C:
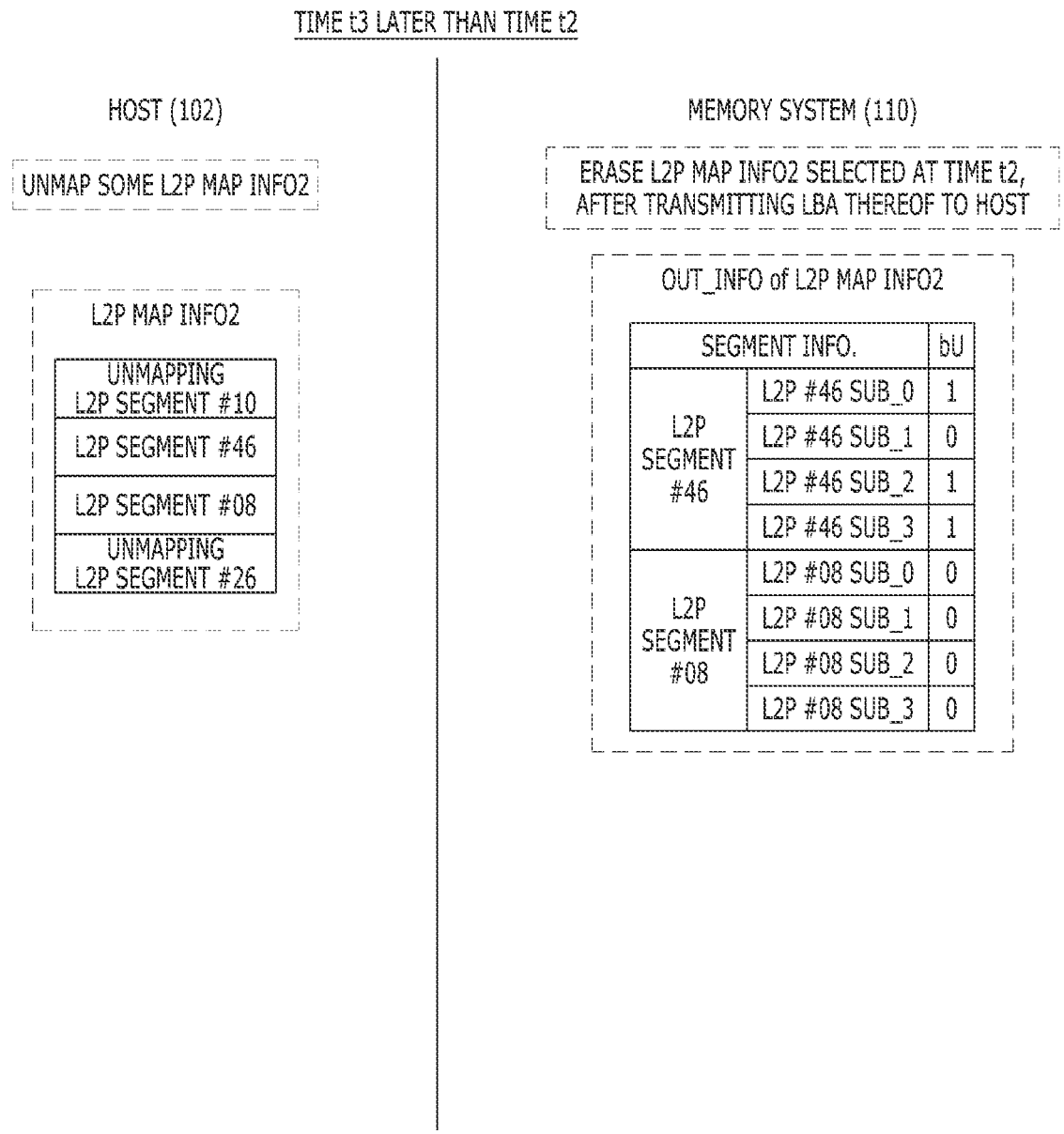

FIGS. 12A to 12C are diagrams illustrating a second operation in which the host 102 and the memory system 110 share map information in accordance with the embodiment of the disclosure.

FIG. 12A illustrates an operation of sharing map information by the host 102 and the memory system 110 at a time t1 similar to FIG. 11A described above. FIG. 12B illustrates an operation of sharing map information by the host 102 and the memory system 110 at a time t2 similar to FIG. 11B described above. FIG. 12C illustrates an operation of sharing map information by the host 102 and the memory system 110 at a time t3 similar to FIG. 11C described above. Therefore, the time t1 to the time t3 to be described below with reference to FIGS. 12A to 12C may have the same meanings as the time t1 to the time t3 described above with reference to FIGS. 11A to 11C. The second operation to be described below with reference to FIGS. 12A to 12C and the first operation described above with reference to FIGS. 11A to 11C may have a difference in terms of a scheme in which the memory system 110 generates and updates log information OUT_INFO of L2P MAP INFO2 on second map information L2P MAP INFO2.

Referring to FIG. 12A, at the time t1, the controller 130 may generate first map information L2P MAP INFO1 to map a physical address of the memory device 150 to a logical address from the host 102. Also, at the time t1, the controller 130 may output the some second map information L2P MAP INFO2 of the first map information L2P MAP INFO1 to the host 102 (SEND L2P MAP INFO2). Further, at the time t1, the controller 130 may generate log information OUT_INFO of L2P MAP INFO2 on the second map information L2P MAP INFO2 (GENERATING OUT_INFO of L2P MAP INFO2) corresponding to the output of the second map information L2P MAP INFO2 to the host 102. Moreover, at the time t1, the host 102 may store the second map information L2P MAP INFO2 from the memory system 110, in the host memory 106 (STORING L2P MAP INFO2). After the time t1, the host 102 may include a physical address in a command to be transferred to the memory system 110, based on the second map information L2P MAP INFO2 stored in the host memory 106 (SEND COMMAND WITH PBA). That is, based on a logical address to be transferred to the memory system 110, the host 102 may find a physical address corresponding to the logical address, in the second map information L2P MAP INFO2. If the physical address exists, the host 102 may transfer the command with the logical address and the physical address to the memory system 110. If the physical address does not exist, the host 102 may transfer the command with the logical address to the memory system 110. The memory system 110 may receive the command with the physical address from the host 102 and may perform a command operation corresponding to the command. For example, when the host 102 transfers the physical address corresponding to a read command, the controller 130 may access and output data using the corresponding physical address, thereby reducing a time required for the command operation corresponding to the read command.

The second map information L2P MAP INFO2 may be managed in the unit of a map segment. That is, a plurality of map segments may be included in the second map information L2P MAP INFO2, and the second map information L2P MAP INFO2 to be outputted to the host 102 from the memory system 110 may include at least one map segment. The log information OUT_INFO of L2P MAP INFO2 on the second map information L2P MAP INFO2 may also be generated in a form for identifying a map segment. For example, the second map information L2P MAP INFO2 may include four map segments L2P SEGMENT #10, L2P SEGMENT #46, L2P SEGMENT #08 and L2P SEGMENT #26. Therefore, the log information OUT_INFO of L2P MAP INFO2 on the second map information L2P MAP INFO2 may also be generated in a form for identifying a map segment.

As the operation of outputting the second map information L2P MAP INFO2 to the host 102 from the memory system 110 (SEND L2P MAP INFO2), the operation described above with reference to FIGS. 7 to 10 may be used.

In detail, when at least one map segment identified as an output map segment exists as a result of checking, the controller 130 may output at least one map segment identified as an output map segment, to the host 102, corresponding to a first command from the host 102. The first command may not be limited. For example, the first command may be a read command, a write command or an erase command. According to an embodiment, the first command may be a command which is specially set for the host 102 to receive second map information from the memory system 110.

According to an embodiment, as described above with reference to FIGS. 7 and 8, after performing a command operation corresponding to the first command from the host 102, when at least one map segment identified as an output map segment exists as a result of checking, the controller 130 may output at least one map segment identified as an output map segment, by including it in a response to the first command, which is to be outputted to the host 102. According to an embodiment, as described above with reference to FIGS. 9 and 10, when at least one map segment identified as an output map segment exists, the controller 130 may notice a request for outputting the second map information L2P MAP INFO2 to the host 102. When the request for outputting the second map information L2P MAP INFO2 is noticed from the memory system 110, the host 102 may check a state of the host memory 106, may selectively generate the first command depending on a checking result, and may output the first command to the memory system 110.

When the first command is received from the host 102, after a command operation corresponding to the first command is performed, at least one map segment identified as an output map segment may be included in a response to the first command, which is to be outputted to the host 102. According to an embodiment, when at least two map segments are determined as output map segments, the controller 130 may output a predetermined number of map segments to the host 102 by successively including them in a response to one first command.

When generating the log information OUT_INFO of L2P MAP INFO2 on the second map information L2P MAP INFO2, the controller 130 may generate the log information OUT_INFO of L2P MAP INFO2 not only in the form for identifying map segments but also in a form for divisionally identifying four map sub-segments L2P #10 SUB_0, L2P #10 SUB_1, L2P #10 SUB_2, L2P #10 SUB_3, L2P #46 SUB_0, L2P #46 SUB_1, L2P #46 SUB_2, L2P #46 SUB_3, L2P #08 SUB_0, L2P #08 SUB_1, L2P #08 SUB_2, L2P #08 SUB_3, L2P #26 SUB_0, L2P #26 SUB_1, L2P #26 SUB_2 and L2P #26 SUB_3 of the respective four map segments L2P SEGMENT #10, L2P SEGMENT #46, L2P SEGMENT #08 and L2P SEGMENT #26. This is because, when the second map information L2P MAP INFO2 is identified in the unit of a map segment, and a substantially small number of logical/physical information among a plurality of map information in one map segment is updated, if it is determined that the entire one map segment is updated, an inefficient operation may be caused. That is, when a specific segment is determined to be in an updated state, the controller 130 may need to perform an operation of outputting the specific segment to the host 102 or storing the specific segment in the memory device 150. Because of this fact, in order to efficiently perform an operation of determining an updated state of a specific segment, the controller 130 may use a scheme in which one segment is divided into and identified by a plurality of sub-segments.

In detail, when generating the log information OUT_INFO of L2P MAP INFO2 on the four map segments L2P SEGMENT #10, L2P SEGMENT #46, L2P SEGMENT #08 and L2P SEGMENT #26 in the second map information L2P MAP INFO2, the controller 130 may generate 16 update information bU corresponding to the 16 map sub-segments L2P #10 SUB_0, L2P #10 SUB_1, L2P #10 SUB_2, L2P #10 SUB_3, L2P #46 SUB_0, L2P #46 SUB_1, L2P #46 SUB_2, L2P #46 SUB_3, L2P #08 SUB_0, L2P #08 SUB_1, L2P #08 SUB_2, L2P #08 SUB_3, L2P #26 SUB_0, L2P #26 SUB_1, L2P #26 SUB_2 and L2P #26 SUB_3. Through the 16 update information bU, the controller 130 may indicate which map sub-segment among the 16 map sub-segments in the second map information L2P MAP INFO2 is updated and which map sub-segment is not updated. When the occupation percentage of update information bU indicating 'updated' of the four update information bO corresponding to one specific map segment is greater than or equal to a predetermined percentage, the controller 130 may determine the one specific map segment as an updated state. For example, in the drawing, a map sub-segment of which the value of the update information bU is '0' is not updated and a map sub-segment of which the value of the update information bU is '1' is updated. Since in FIG. 12A none of the 16 map sub-segments in the second map information L2P MAP INFO2 are updated, it may be seen that the values of all the 16 update information bU corresponding to the 16 map sub-segments are '0.'

As described above with reference to FIG. 6, when a command from the host 102 includes not only a logical address but also a physical address as a result of checking, the controller 130 may determine the validity of the physical address by referring to update information bU. For example, when a read command from the host 102 includes a first logical address and a first physical address, the controller 130 may determine the validity of the first physical address by checking the update information bU of the map sub-segment corresponding to the first logical address in the log information OUT_INFO of L2P MAP INFO2 on the second map information L2P MAP INFO2. When it is checked that the update information bU has the value of '0' indicating 'not updated,' the controller 130 may determine the first physical address as valid. Therefore, the controller 130 may perform the read command from the host 102, by using the first physical address. Conversely, when it is checked that the update information bU has the value of '1' indicating 'updated,' the controller 130 may determine the first physical address as invalid. Therefore, the controller 130 may neglect the first physical address and search for a valid physical address corresponding to the first logical address in the first map information L2P MAP INFO1. Then, the controller 130 may perform the read command from the host 102, using a searched valid physical address.

Referring to FIG. 12B, at the time t2 later than the time t1, the controller 130 may identify map information updated by a predetermined operation PREDETERMINED OPERATION (see FIG. 1) of the second map information L2P MAP INFO2, as third map information SELECTED L2P MAP INFO2. For example, it may be seen that, the first and fourth map segments L2P SEGMENT #10 and L2P SEGMENT #26 are determined as the third map information of the four map segments L2P SEGMENT #10, L2P SEGMENT #46, L2P SEGMENT #08 and L2P SEGMENT #26 in the second map information L2P MAP INFO2.

In detail, determination or selection as the third map information may be implemented depending on how many sub-segments are updated among the entire sub-segments in each map segment. According to an embodiment, a reference such as whether the occupation percentage of updated sub-segments is greater than or equal to 20%, 30%, 50% or 70% may be set. In the first map segment L2P SEGMENT #10 of the four map segments, it may be seen that the values of the update information bU corresponding to the first, third and fourth map sub-segments L2P #10 SUB_0, L2P #10 SUB_2 and L2P #10 SUB_3 are '1' indicating 'updated,' of the four map sub-segments L2P #10 SUB_0, L2P #10 SUB_1, L2P #10 SUB_2 and L2P #10 SUB_3. Further, the first map segment L2P SEGMENT #10 may be determined as the third map information according to a predetermined reference (e.g., 40%). In the second map segment L2P SEGMENT #46 of the four map segments, it may be seen that, the value of the update information bU corresponding to the fourth map sub-segment L2P #46 SUB_3 is '1' indicating 'updated,' of the four map sub-segments L2P #46 SUB_0, L2P #46 SUB_1, L2P #46 SUB_2 and L2P #46 SUB_3. Further, the second map segment L2P SEGMENT #46 may not be determined as the third map information according to the predetermined reference (e.g., 40%). In the third map segment L2P SEGMENT #08 of the four map segments, it may be seen that the values of all the update information bU corresponding to the four map sub-segments L2P #08 SUB_0, L2P #08 SUB_1, L2P #08 SUB_2 and L2P #08 SUB_3 are '0' indicating 'not updated.' Accordingly, the third map segment L2P SEGMENT #08 may not be determined as the third map information. In the fourth map segment L2P SEGMENT #26 of the four map segments, it may be seen that the values of the update information bU corresponding to third and fourth map sub-segments L2P #26 SUB_2 and L2P #26 SUB_3 are '1' indicating 'updated,' of the four map sub-segments L2P #26 SUB_0, L2P #26 SUB_1, L2P #26 SUB_2 and L2P #26 SUB_3. Further, the fourth map segment L2P SEGMENT #26 may be determined as the third map information according to the predetermined reference (e.g., 40%).

The controller 130 may output logical addresses LBA of at least one selected map segment identified as the third map information to the host 102, in response to a command from the host 102 (SEND LBA of SELECTED L2P MAP INFO2). For example, the controller 130 may output logical addresses LBA of the first and fourth map segments L2P SEGMENT #10 and L2P SEGMENT #26 which are identified as the third map information, to the host 102. At this time, the controller 130 may output logical addresses LBA of one or more selected map segments identified as the third map information, to the host 102, by grouping the logical addresses LBA in the unit of a segment. Also, the controller 130 may select logical addresses LBA of one or more selected map segments identified as the third map information, and may output selected logical addresses LBA to the host 102. Here, selecting logical addresses LBA of selected map segments in the unit of a segment may mean selecting, at once, all of a plurality of logical addresses in one segment. Conversely, selecting logical addresses LBA of selected map segments may mean selecting some logical addresses of the logical addresses in one segment and not selecting the remaining logical addresses in the one segment. For example, the controller 130 may output, at once, the logical addresses LBA of the first map segment L2P SEGMENT #10 of the logical addresses LBA of the first and fourth map segments L2P SEGMENT #10 and L2P SEGMENT #26 identified as the third map information, to the host 102. Then, the controller 130 may output, at once, the logical addresses LBA of the fourth map segment L2P SEGMENT #26 to the host 102. Also, the controller 130 may select logical addresses LBA of the first and fourth map segments L2P SEGMENT #10 and L2P SEGMENT #26 identified as the third map information, and output the selected logical addresses LBA to the host 102.

As the operation SEND LBA of SELECTED L2P MAP INFO2 of outputting the logical addresses LBA of one or more selected map segments identified as the third map information, from the memory system 110 to the host 102, the operation described above with reference to FIGS. 7 to 10 may be used.

In detail, as described above with reference to FIG. 7, after performing a command operation corresponding to a second command from the host 102, when the third map information exists as a result of checking, the controller 130 may output logical addresses LBA of one or more selected map segments in the third map information, in the unit of a segment or one by one, by including them in a response to the second command, which is to be outputted to the host 102. The second command may not be limited. For example, the second command may be a read command, a write command or an erase command. For example, at the time t2, after performing a read operation corresponding to a read command from the host 102, the controller 130 may output the logical addresses LBA of the first and fourth map segments L2P SEGMENT #10 and L2P SEGMENT #26 which are identified as the third map information, in the unit of a segment or by one or more of the logical addresses LBA, by including them in a response to the read command. For another example, at the time t2, after performing a program operation corresponding to a program command from the host 102, the controller 130 may output the logical addresses LBA of the first and fourth map segments L2P SEGMENT #10 and L2P SEGMENT #26 which are identified as the third map information, in the unit of a segment or by one or more of the logical addresses LBA, by including them in a response to the program command.

In some embodiments, a predetermined flag (not illustrated) may be included in a response to the second command, which is to be outputted to the host 102 from the memory system 110, and a default value of the predetermined flag may be '0.' The controller 130 may set the predetermined flag to '1,' corresponding to a logical address of the third map information in the response. After outputting the second command to the memory system 110, when the response to the second command is received from the memory system 110, the host 102 may check a state of the flag in the response to the second command. Further, the host 102 may be aware of whether a logical address is included in the response to the second command depending on a checking result.

For example, at the time t1 described above with reference to FIG. 12A, the third map information does not exist. Because of this fact, the controller 130 may continuously maintain the flag in the response to be outputted to the host 102 after performing the command operation corresponding to the second command from the host 102, at '0.' Accordingly, at the time t1, the host 102 may check that the flag in the response to the second command, which is inputted from the memory system 110, is in a reset state of '0.' Thereby, the host 102 may be aware that a logical address is not included in the response to the second command. For another example, at the time t2 described above with reference to FIG. 12B, the third map information may exist. Because of this fact, when outputting a logical address of the third map information to the host 102, the controller 130 may change the flag in the response to '1' after performing the command operation corresponding to the second command from the host 102. Accordingly, at the time t2, the host 102 may receive the flag in the response to the second command and check that the flag is '1.' Further, the host 102 may thereby be aware that a logical address is included in the response to the second command, and may check a value of the logical address in the response to the second command.

Referring to FIGS. 12B and 12C, after outputting logical addresses LBA of at least one selected map segment identified as the third map information, to the host 102 (SEND LBA of SELECTED L2P MAP INFO2) in response to a command inputted from the host 102 at the time t2, the controller 130 may erase the third map information in the second map information L2P MAP INFO2 at the time t3 later than the time t2. For example, after outputting the logical addresses LBA of the first and fourth map segments L2P SEGMENT #10 and L2P SEGMENT #26 identified as the third map information of the four map segments L2P SEGMENT #10, L2P SEGMENT #46, L2P SEGMENT #08 and L2P SEGMENT #26 in the second map information L2P MAP INFO2, to the host 102 at the time t2, the controller 130 may erase the first and fourth map segments L2P SEGMENT #10 and L2P SEGMENT #26 at the time t3 later than the time t2. Therefore, at the time t3, the second map information L2P MAP INFO2 may include only the two map segments L2P SEGMENT #46 and L2P SEGMENT #08.

After receiving the logical addresses LBA of the third map information from the memory system 110 at the time t2, the host 102 may unmap map information corresponding to the logical addresses LBA of the third map information in the second map information L2P MAP INFO2 stored in the host memory 106 (UNMAPPING). When the logical addresses LBA of the third map information are received from the memory system 110 in the unit of a segment, the host 102 may unmap map information corresponding to the logical addresses LBA of the third map information in the second map information L2P MAP INFO2 stored in the host memory 106 in the unit of a segment. Also, when the logical addresses LBA of the third map information are received one by one from the memory system 110, the host 102 may unmap map information corresponding to the logical addresses LBA of the third map information in the second map information L2P MAP INFO2 stored in the host memory 106, one by one. In other words, while the host 102 may unmap the second map information L2P MAP INFO2 stored in the host memory 106 in the unit of a segment, unlike the illustration of the drawing, the host 102 may select one by one and unmap the second map information L2P MAP INFO2 stored in the host memory 106.

Therefore, the host 102 does not use any more map information unmapped in the second map information L2P MAP INFO2 stored in the host memory 106. Namely, the host 102 may not determine any more map information unmapped in the second map information L2P MAP INFO2 stored in the host memory 106, as valid map information. Because of this fact, when transmitting a read command corresponding to unmapped map information to the memory system 110, the host 102 may transmit the read command without a physical address as described above with reference to FIG. 6, that is, the read command with only a logical address, to the memory system 110. Since the memory system 110 receives the read command without a physical address, it is not necessary to perform an operation of determining the validity of a physical address.

Figure 13:
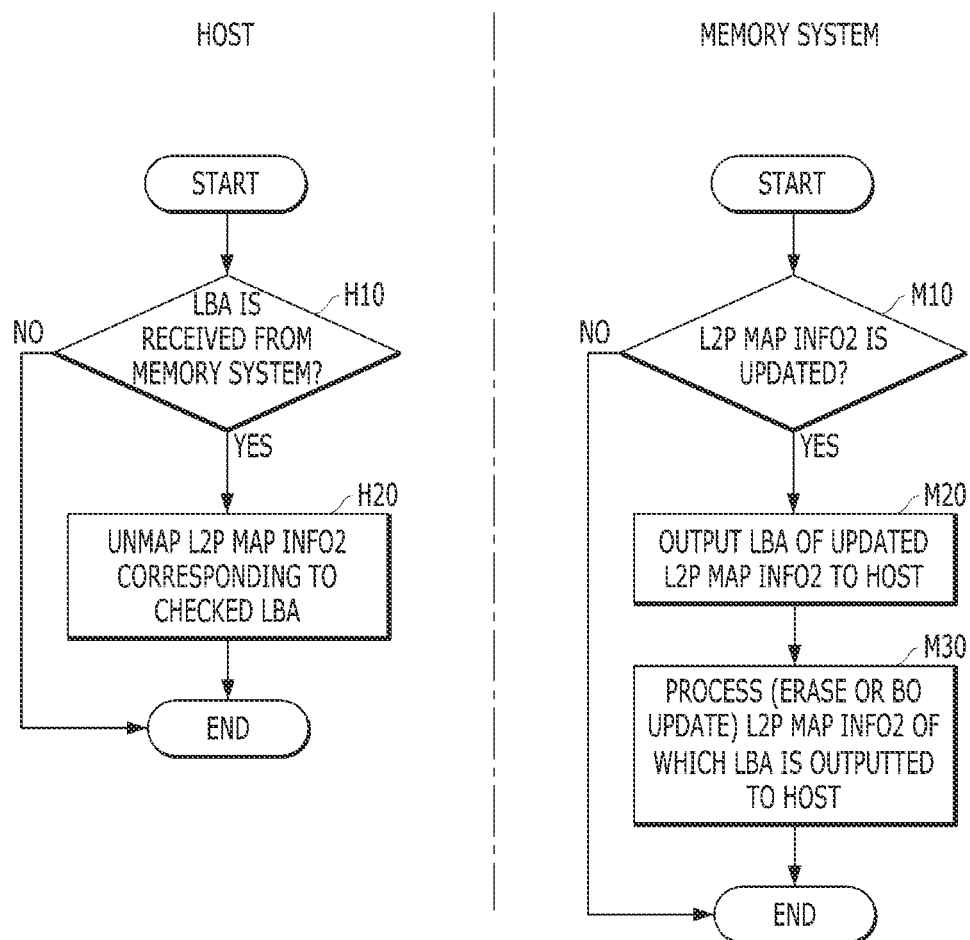
FIG. 13 is a flow chart illustrating a third operation in which the host and the memory system share map information in accordance with the embodiment of the disclosure.

FIG. 13 is a flow chart illustrating a third operation in which the host and the memory system share map information in accordance with the embodiment of the disclosure. In detail, FIG. 13 illustrates a case where the memory system transmits logical addresses of updated map information to the host during a process in which the host and the memory system interoperate.

Referring to FIG. 13, the memory system 110 may check whether second map information L2P MAP INFO2, which is shared with the host 102, is updated due to a predetermined operation PREDETERMINED OPERATION (see FIG. 1)(M10).

In the case where the second map information is not updated (NO of M10), the memory system 110 may not perform a separate special operation.

In the case where the second map information is updated (YES of M10), the memory system 110 may output logical addresses LBA of the updated second map information to the host 102 (M20).

After the step M20, the memory system 110 may process the updated second map information (M30). According to an embodiment, the memory system 110 may perform erasing the updated second map information. According to an embodiment, the memory system 110 may perform updating information bO indicating that the updated second map information is outputted to the host 102.

The host 102 may check whether a logical address is received from the memory system 110 (H10).

When it is checked that a logical address is not received from the memory system 110 (NO of H10), the host 102 may not perform a separate special operation.

When it is checked that a logical address is received from the memory system 110 (YES of H10), the host 102 may unmap second map information corresponding to the checked logical address, from the second map information L2P MAP INFO2 shared with the memory system 110 (H20).

As is apparent from the above-described embodiments, a memory system may transmit map information to a host. After processing a command transmitted by the host, the memory system may transmit the map information by using a response corresponding to the command. Further, after transmitting the map information to the host, the memory system may generate and store a log or a history for the transmitted map information. After the map information is transmitted from the memory system to the host, when the map information stored in the host becomes dirty due to the update of the map information performed in the memory system, the memory system may transmit information corresponding to the update of the map information to the host such that the host may self-unmap the dirty map information therein. Through this, it is possible to prevent unnecessary map information from being transmitted from the host to the memory system, and thereby, the operation performance of the memory system may be improved.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
a nonvolatile memory device; and
a controller suitable for generating first map information which maps physical addresses of the nonvolatile memory device to logical addresses received from a host,
wherein the controller:
selects some segments of the first map information as second map information, generates a first response for a first command after performing an operation corresponding to the first command received from the host, and outputs the first response to the host, the first response including the second map information,
determines whether the second map information is updated, and determines updated map segments as third map information,
generates a second response for a second command after performing an operation corresponding to the second command received from the host, and outputs the second response to the host, the second response including a logical address of the third map information when the third map information exists, and
reads a data corresponding to a first physical address from the nonvolatile memory device when the first physical address together with a third command are received from the host, and outputs the data as response corresponding to the third command.

2. The memory system according to claim 1,
wherein the second response includes a set flag, and
wherein the controller sets the set flag included in the second response when the third map information exists.

3. The memory system according to claim 1,
wherein the controller erases the third map information from the second map information after outputting the second response including the logical address of the third map information.

4. The memory system according to claim 1, wherein the controller writes a data to a storage area of the nonvolatile memory device corresponding to a second physical address when the second physical address together with a fourth command are received from the host.

* * * * *